(12) United States Patent
Hayakawa

(10) Patent No.: US 6,741,268 B1
(45) Date of Patent: May 25, 2004

(54) PAGE INFORMATION DISPLAY METHOD AND APPARATUS, AND STORAGE MEDIUM FOR STORING PROGRAM OR DATA FOR DISPLAY PAGE

(75) Inventor: Keisuke Hayakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 790 days.

(21) Appl. No.: 09/625,998

(22) Filed: Jul. 26, 2000

(30) Foreign Application Priority Data

Jul. 26, 1999 (JP) .......................................... 11-210788

(51) Int. Cl.$^7$ ................................................ G06F 3/14
(52) U.S. Cl. ...................... 345/777; 345/776; 345/815
(58) Field of Search ............................... 345/776, 777, 345/779, 815, 818, 817, 863, 179, 853, 854, 839, 856

(56) References Cited

U.S. PATENT DOCUMENTS

| 5,283,864 | A | * | 2/1994 | Knowlton | .................... 345/776 |
| 5,559,946 | A | * | 9/1996 | Porter | .................... 345/777 X |
| 5,604,861 | A | * | 2/1997 | Douglas et al. | ............. 345/776 |
| 5,909,690 | A | * | 6/1999 | Tanigawa et al. | ....... 345/839 X |
| 6,037,941 | A | * | 3/2000 | Goto | .......................... 345/777 |
| 6,486,895 | B1 | * | 11/2002 | Robertson et al. | .......... 345/776 |

FOREIGN PATENT DOCUMENTS

JP            5-165595         7/1993

* cited by examiner

Primary Examiner—Raymond J. Bayerl
(74) Attorney, Agent, or Firm—Foley & Lardner LLP

(57) ABSTRACT

To provide a user interface for viewing the information which is easily understood by all people, irrespective of the computer experiences, the present invention adopts a user interface having a metaphor like a book, newspaper or magazine, and for realizing the metaphor of this book, the electronic information is allowed to view in a unit of page of predetermined size therefore, the electronic information is displayed in a unit of page of predetermined size in an information viewing area of a display portion.

43 Claims, 33 Drawing Sheets

FIG.21(A)

| Display dot number data [dot] | Total page number data | Unit tag length | Minimum reference length |
|---|---|---|---|
| 1600 | ap | 1600/ap | 80 |
| 1200 | | | 10 |

FIG.21(B)

| Display dot number data [dot] | Total page number data | Tag display area length | Minimum reference length | Unit tag length |
|---|---|---|---|---|
| 1600 | ap | 40 cm | 2 cm | $\frac{40}{ap}$ [cm] |
| 1200 | | 30 cm | 0.5 cm | |

FIG. 30

| Kind of pointer event | Content of page rolling |
|---|---|
| Drug one tag | Display next page of drugged page |
| Click one tag | Display clicked page |
| Drug plural tags | Display drugged pages successively |
| Pointer down time or pressure above predetermined value | Page rolling all sheets in accordance with time or pressure at once |

PAGE INFORMATION DISPLAY METHOD AND APPARATUS, AND STORAGE MEDIUM FOR STORING PROGRAM OR DATA FOR DISPLAY PAGE

BACKGROUND OF THE INVENTION

1. Field of the Invention

The present invention relates to a page information display method and apparatus, and in particular to a page information display method and apparatus for displaying electronic information in a unit of page of predetermined size.

2. Description of the Prior Art

Conventionally, the information required for the work, study or life is provided from the origins of information to the reader, using media such as books, or periodical publications, e.g., newspaper or magazine. Also, the administrative or judicial information is provided in publications or documents.

In recent years, the Internet (Internetwork) has been well prepared to enable the computers for the government, company, college, and individual to be interconnected directly or via the telephone network. with the development of providing the information via the Internet, a variety of information is created as an ML page (e.g., HTML page or XML page) on the basis of make-up language, which allows this page (typically referred to as a home page) to be accessed using a computer. To provide the ML page, a large amount of documents are created in a PDF format, and can be downloaded from respective home pages. Just as the patent gazette is provided in CD-ROM, the important information may be publicized or circulated in the computer readable medium other than the Internet.

The information provided in a format viewable using a computer may include information contents from a wide variety of information sources covering data sheets of products manufactured by the company, the information of new products, documents created by the administration, pieces of legislation, the Supreme Court precedents, research results of the college laboratory, detailed information of lodgings in a certain region, news, weather forecasts, for example. These may be duplicately provided in other paper media such as newspaper columns, magazines, or catalogues, but simply provided through the Internet or in the computer readable medium. Most of the past information may be often difficult to obtain substantially in paper media.

As the information networks such as the Internet are prepared throughout the world in the future, more information will penetrate into the society increasingly. Thereby, it is apprehended that there occurs a personal difference in the amount or quality of necessary information between the user familiar with the computer and the user unfamiliar with the computer.

Means for operating the computer may be a graphical user interface (GUI, hereinafter referred to as a desktop metaphor) useful in most cases, which is metaphoric to the working environment of desk in the actual world. Through the user interface in the desktop metaphor, the working environment of desk is comically drawn to allow a file structure specific to the computer which is nonobjective and uneasy to understand to correspond with a file or folder present in the working environment of desk. Thus, the computer beginners can operate the computer intuitively. For example, to delete a file, the file indicated by an icon which is metaphoric to paper is drugged and dropped into a garbage box.

However, through use of the user interface of desktop metaphor, many people in the world may think that the simple operation of viewing electronic information in the computer is difficult. That is, through the user interface of desktop metaphor, it is required to view electronic information by instructing or operating indirectly a virtual device such as buttons drawn on the display of computer, a pop-up menu, or a slide bar, using an input device such as a mouse or keyboard for the computer,

BRIEF SUMMARY OF THE INVENTION

Object of the Invention

In the conventional example as described above, there was a drawback that viewing of information through the use of a computer was difficult. That is to say the operation scheme specific to the computer may take considerable time to master the operation. Thus, everyone can not easily make use of the electronic information provided by the computer. Accordingly, there is a personal difference in the quality and amount of information available between the users. If many people feel it difficult to use the computer, the information provider can not abolish the paper media for the information necessary to be conveyed to entirely transfer to the electronic information.

For example, it was reported that when a large company introduced a computer system to do all business contacts and settlements of accounts by abolishing the paper media, the preparatory period was set to two years, and one year or more was dedicated to an education period for new staff members to get accustomed to the computer, so that the company fully succeeded in computerization. Some colleges provide computer literacy courses to educate the basic usage of computer. Generally, in the study and training of new staff members in the companies or government offices, the computer operation is educated. They are taught about not only viewing of the information, but also input and origination of the information. However, for the people who never have used the computer at all, it is a difficult work only to view the information.

Therefore, it is desirable to provide a user interface which is intuitive and easy to operate, rather than a desktop metaphor. Particularly, an information viewing device which has a simple appearance and enables the operation intended to view the electronic information is promising.

To cope with such a problem, a prior viewing device which is an improved desktop metaphor was disclosed in Japanese Patent Laid-Open No. 5-165595. This realizes the appearance of a book on the display portion, and relies on a method of visualizing the electronic information on the display portion by outputting the overlapped pages composed of a plurality of sentences dislocated slightly to the display portion. A heading symbolizing a set of sentences is appended with the content of sentences as a unit of set to improve the desktop metaphor. However, in this conventional example, the amount of information to be displayed increases in proportion to an increase in the number of pages. Therefore, it is often difficult to secure the display area sufficiently. Consequently, there is a problem that the viewing area is reduced to make viewing difficult.

A CRT or a liquid crystal display is becoming higher in resolution year after year. For example, if the resolution of about 150 dpi in A4 size is realized, it is possible to view the whole one face of newspaper in A4 size. If the display has substantially a resolution of facsimile, the newspaper or magazine is made readable in a size which is smaller than the actual size. In such a high-resolution display, the display of 1200×1600 dots can be made in A4 size. Therefore, the physical size becomes too small to be useful for the icon in the conventional operating system, giving an impression of something intricate to the user, possibly resulting in a user interface which is rather uneasy to understand.

Therefore, the development of a user interface in the next generation which can be intuitively used by the computer beginners as well is required. Then, it is desired to adopt a high-resolution display without changing the operation. In other words, it is desired to develop the user interface which is easy to master the operation and not dependent on the resolution.

It is an object of the present invention to resolve the inconveniences associated with the conventional example, and to provide a user interface for viewing the information which is easily understood by all people, irrespective of the computer experiences.

SUMMARY OF THE INVENTION

Therefore, the present invention adopts a user interface having a metaphor like a book, newspaper or magazine. To realize the metaphor of this book, the electronic information is allowed to view in a unit of page of predetermined size. That is, the electronic information is displayed in a unit of page of predetermined size in an information viewing area of a display portion. And there is only a single information viewing area and the page cannot be rolled physically, unlike books. But a user interface which is metaphoric to the operation of rolling the page enables the information viewing area to be effectively used. For a book or the like, it is possible to check the position of the current page relative to the total page in view of the thickness of sheets, when opened, or search for a content of the book on the page number roughly estimated. To facilitate the viewing operation of electronic information substantially in the information viewing area of one page which is metaphoric to using the book or the like, the present invention makes effective use of a tag. Due to the use of the tag, the user interface having the metaphor of book or the like is implemented, making it possible to increase the users for viewing the electronic information.

The present invention has a novel feature of altering the tag attributes such as a tag display area, overlapping of tags, length, width and position (height) of tag, in accordance with the total page number of electronic information and the page number of current page, as will be detailed later. Note that the user interface metaphoric to the operation of rolling the page will be disclosed in more detail in a separate application.

In a first group of inventions (claims 1 to 10), when the electronic information is a book or the like, a tag display area is provided on either end in a page rolling direction. With a tag of a page currently displayed as the boundary, a tag indicating each page preceding a current page is displayed in other display area, for example, a left display area, while a tag indicating each page succeeding the current page is displayed in one display area, for example, a right display area. Thus, though the electronic information of one page is simply displayed in an information viewing area, the user is prompt to recognize intuitively what amount the total page of electronic information is and to what extent the user has read by now or the current page.

The first invention is a page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page, and a tag display area for displaying a tag indicating the content of said page, the tag display area being provided on either end of said information viewing area, the method including displaying a current page of current display object read from said storage portion in said information viewing area and displaying a tag appended to said current page in said one or the other tag display area, displaying a tag appended to each page following said current page in one tag display area before or after displaying said current page, and displaying a tag appended to each page preceding a page number of said current page in the other tag display area before or after displaying said current.

In displaying the current page in the information viewing area, a tag indicating the content of current page such as the page number is displayed in the tag display area. Subsequently, in displaying the succeeding page tag, a tag for calling each page succeeding the current page is displayed in the one tag display area provided in the information viewing area. On the other hand, in displaying the preceding page tag, a tag for each page preceding the current page or which has typically been already viewed is displayed in the other tag display area. Thus, in a pair of tag display areas between which the information viewing area is provided, a tag indicating each page already viewed and a tag indicating each page to be viewed from now on are displayed around the current page as the center. Therefore, the position of the page being currently viewed relative to the total page can.be informed to the user at a glance.

In a second group of inventions (claims 11 to 21), in starting viewing electronic information, the tag length is made variable in accordance with the total number of pages. It is desirable that a tag display area is provided on either end of a display portion, but the variable tag length makes the user interface more effective even with the tag indication in one tag display area. That is, the tag length appendant to the current page and each of the preceding and succeeding pages is determined depending on the total page number of electronic information and the physical length or the dot number of the tag display area. Thus, if a larger number of pages of electronic information is displayed, the tag length is shorter, and the number of tags is greater, than when a small number of pages of electronic information is displayed. Thus, the user can recognize the total page number at a glance. Also, the electronic information involving a large total number of pages may not be displayed with the same length of tag. In such a case, in a preferred embodiment of the second invention, the tag length of current page is maximum, and the tag length is set to be shorter as the page is closer to the start page or last page.

The second invention provides a page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page, in which said display portion comprises a tag display area provided along with said information viewing area on one end or both ends in a page rolling direction to roll the page information in said information viewing area, the method including calculating the tag length of each tag appended to each page in a tag display direction on the basis of the length of tag display area in the tag display direction which is orthogonal to said page rolling direction and the total page number of electronic information stored in said storage portion, displaying the tag in said tag display area, on the basis of the length of each tag calculated in calculating said tag length, and displaying the page of current display object read in said information viewing area, before or after displaying the tag.

Since in calculating the tag length, the tag length of a tag appendant to each page is calculated in accordance with the total page number of electronic information and the length of tag display area, the amount of electronic information can be indicated visually.

In a third group of inventions (claims 22 to 29), when viewing electronic information of one page displayed in the information viewing area is stopped or interrupted, and the page is rolled to view another page, the tag is displayed again. The tag is transferred to one or the other display area while the height of tag displayed once is maintained, in accordance with the embodiment. Also, in a semantic display, it is preferred that the height of tag is recalculated in accordance with the page number of a new current page. Also, when it is desired to move the page by a great amount in the semantic display, the tag displayed in a line state is expanded. Also, a selection between the normal display for making redisplay of the tag with the fixed tag height or the semantic display for changing the tag height continuously may be made in accordance with the total page number of electronic information.

In a fourth group of inventions (claims 30 to 41), the page rolling operation is performed using the tag. Then, using a pointing device such as a fingertip, a pen, a touch panel, or a mouse, various page-rolling operations are implemented in accordance with the pointer event. For example, the page may be rolled on dragging the tag to display a lower page stepwise (e.g., a next page of the rolled page) When a tag is clicked, a page of the tag may be displayed. By rolling the pages consecutively, the operability may be further enhanced. For example, when a plurality of tags are dragged continuously, the pages are consecutively displayed from a page with tag at the drag start position to a page with tag at the drag end position.

The embodiments of the present invention will be disclosed below in detail in the following description and with reference to the drawings. The disclosed invention may be claimed, except for the first to fourth inventions, in an application filed separately. For example, for the inventions regarding a process of transforming the data of link structure into the data of page structure, or a process of rolling the page in accordance with the pointer event in the information viewing area, refer to a separate application which occurs after the present application with the same applicant and the same inventor.

BRIEF DESCRIPTION OF THE DRAWINGS

FIG. 8 is an explanatory view illustrating another display of tag in this embodiment, in which

FIG. 21 shows the page information display data for use in the first example, in which FIG. 21A is a diagram illustrating the definition with the number of dots for the minimum reference length, and FIG. 21B is a diagram illustrating the definition with the physical length for the minimum reference length;

FIG. 30 is a diagram showing the relation between the pointer event and the page rolling in the process as shown in FIG. 29;

FIG. 33 show another conventional user interface, in which

DETAILED DESCRIPTION OF THE PREFERRED EMBODIMENTS

Figure 1:
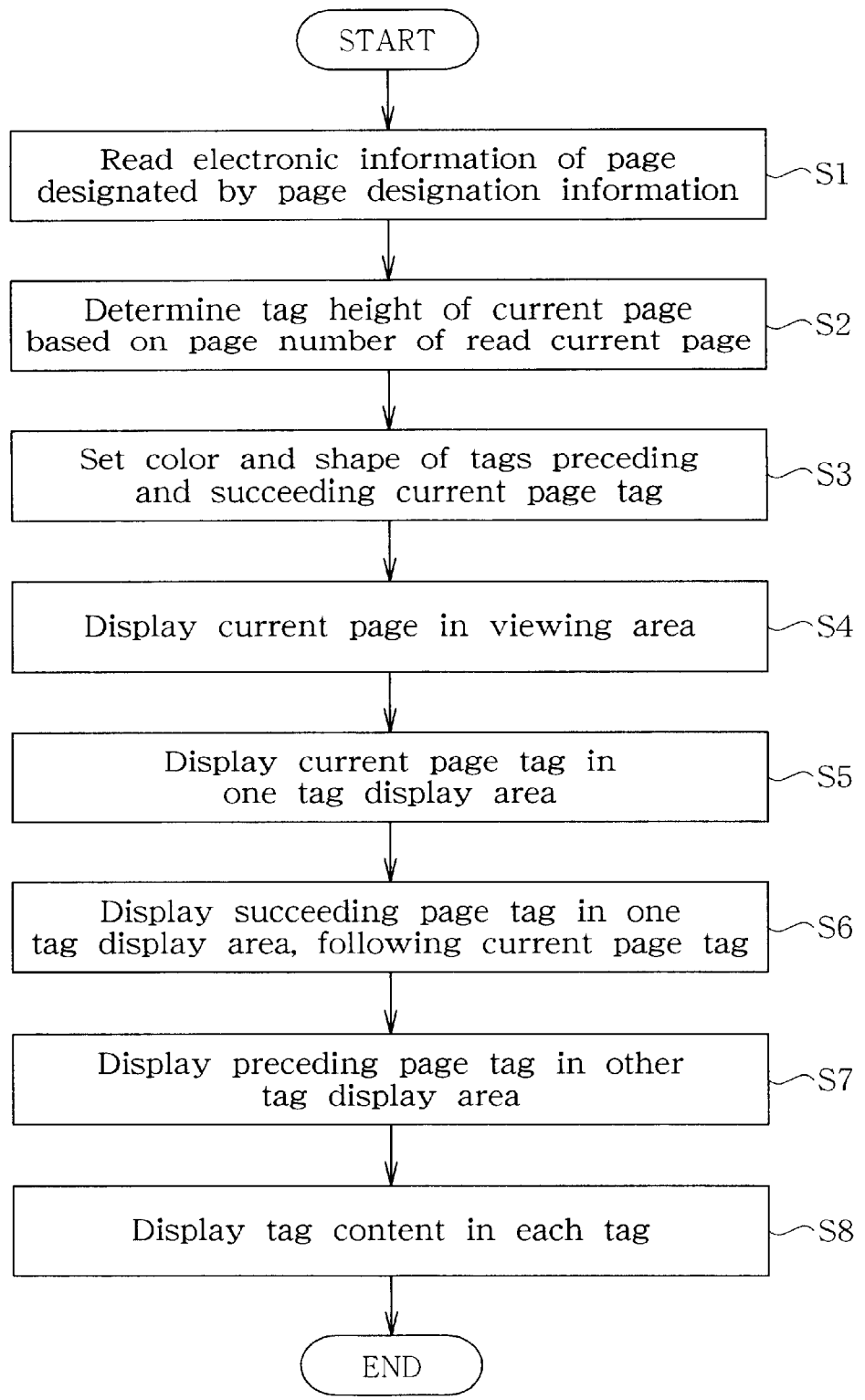
FIG. 1 is a flowchart illustrating the configuration of one embodiment of a page information display method according to the present invention.
Figure 2:
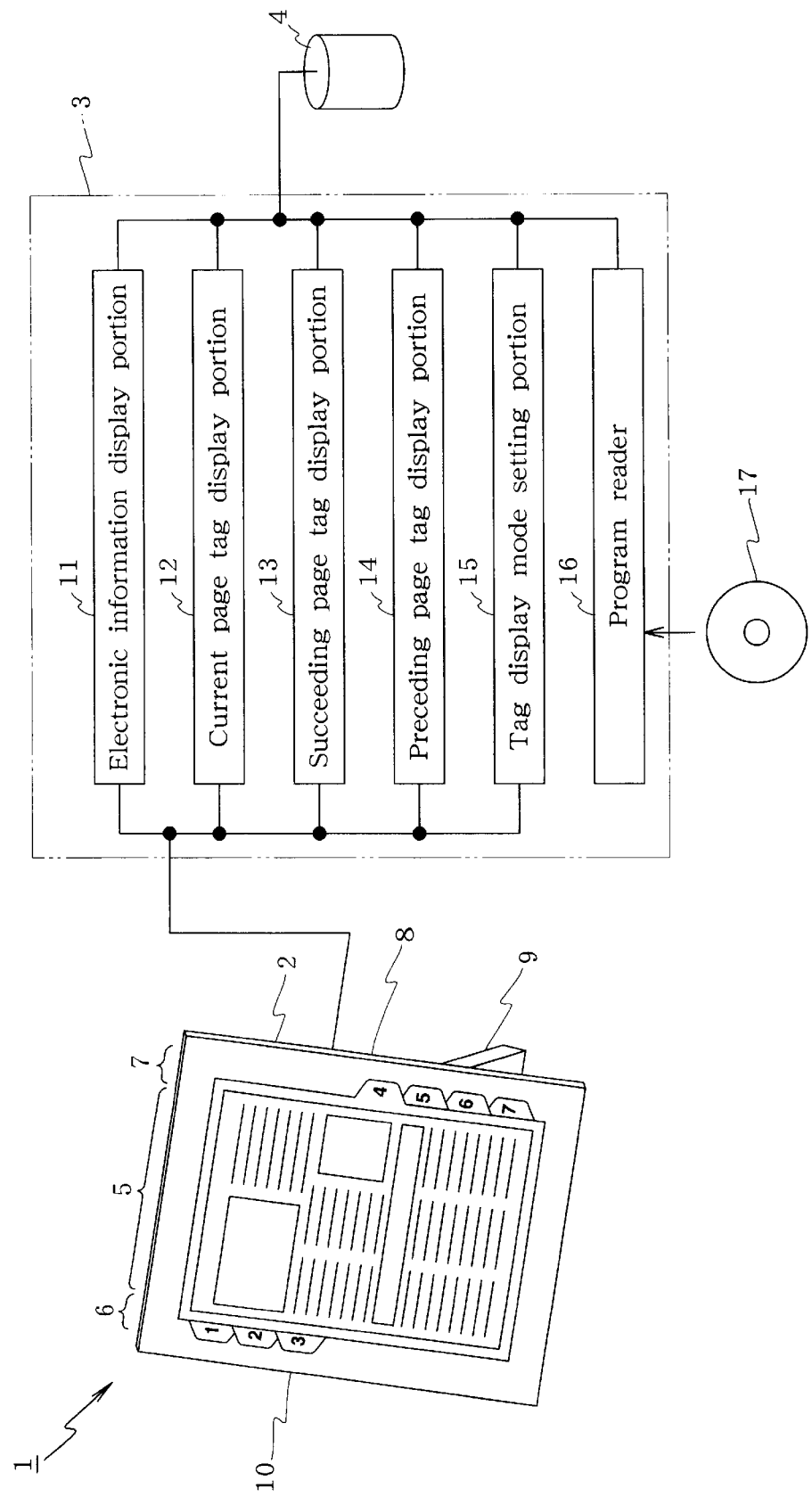
FIG. 2 is a block diagram illustrating the configuration of a page information display apparatus which is suitable for carrying out a process as shown in FIG. 1.

The embodiments of the present invention will be described below with reference to the drawings. FIG. 1 is a flowchart showing a page information display process according to one embodiment of the invention. FIG. 2 is a block diagram showing a configuration of a page information display device which is suitable for practicing this process. In this embodiment, a display portion 1 is provided with an information viewing area 5 for displaying the page information, as shown in FIG. 2. Further, one and other tag display areas 6, 7 are provided to the left and right, or upward and downward of this information viewing area 5. A tag of a page displayed in the information viewing area is displayed a right-side tag display area. Beneath this current page tag, a tag for a succeeding page (succeeding page tag 9) having a page number greater than a current page is appended. And in a left-hand tag display area, a tag for a preceding page (preceding page tag 10) of the current page is appended. In an example of FIG. 2, the fourth page is displayed.

In the example as shown in FIG. 2, the page information display device comprises a storage portion (memory) 4 for storing electronic information having a plurality of pages in a unit of page of predetermined size, a display portion (display) 1 having an information viewing area 5 for displaying electronic information stored in the storage portion 4 in a unit of the page and a tag display area 6, 7 for displaying a tag indicating the content of the page, the tag display area being provided on both ends of the information viewing area 5, and a display controller 3 for displaying the page information read from the storage portion 4, with a tag appended, on the display portion. The display controller executes the process as shown in FIG. 1.

Referring to FIG. 1, first the display controller reads the electronic information of a page designated with page designation information (step S1) Subsequently, the height of a current page tag is determined, on the basis of the page number of read current page (step S2, determining the current page height). Further, the color and shape of a tag indicating each page preceding and succeeding the current page are determined (step S3). At this step S3, the highlighting of current page tag, the tag color or color variation, and the tag shape variation are set.

Subsequently, the current page of current display object read from the storage portion is displayed in the information viewing area at step S4. Further, the tag appendant to the current page is displayed in the one or other tag display area at step S5 (displaying the current page). And before or after displaying the current page, a tag 9 appendant to each page (fifth to seventh page) following the current page (fourth page in the example of FIG. 2) is displayed in one tag display area (S6, displaying the succeeding page tag). Also, before or after displaying the current page, a tag appendant to each page preceding the current page in page number is displayed in the other tag display area (S7, displaying the preceding page tag). In the example of FIG. 1, each tag has the tag content displayed, the tag content being a content of tag (step S8). Other than the page number, a mark or character indicating the place of page may be used.

Referring to FIG. 2, the display controller 3 has a variety of functions to implement the process as shown in FIG. 1. Specifically, it comprises an electronic information display portion 11 for displaying the page information of a current page of current display object read from the storage portion 4 in the information viewing area 5, and a current page tag display portion 12 for displaying the current page tag in the one or other tag display area. The display controller 3 further comprises a succeeding tag display portion 13 for displaying a tag appendant to each page following the current page at a position forward of the height of the current page tag in the one tag display area, and a preceding page tag display portion 14 for displaying a tag appendant to each page preceding the current page in page number at a position rearward of the height of current page in the other tag display area. Also, in a preferred embodiment, the display controller 3 comprises a tag display mode setting portion 15 for setting the mode of tag (shape and color). Also, the current page tag display portion 12 may have a current page tag height calculating function of calculating the page height of current page, on the basis of the ratio of the page number of current page relative to the total page number of electronic information.

The display controller 4 comprises a CPU for executing a page information display program product and a RAM which is a main memory of this CPU. The page information display program is stored in a storage medium such as a CD-ROM and carried to the page information display device. The display controller 4 controls a program reading portion 16 such as a CD-ROM drive to read a program and store it in the storage portion 4. If this page information display program is executed, all or part of the process as shown in FIG. 1 is performed.

This page information display program may comprise the commands for operating the display controller 4 including a current page display command for displaying a current page of current display object read from the storage portion 4 in the information viewing area 5 and displaying a tag appendant to the current page in the one or other tag display area 6, 7, a succeeding page tag display command for displaying a tag appendant to each page following the current page in the one tag display area, before or after displaying the current page, and a preceding page tag display command for displaying a tag appendant to each page preceding the page number of the current page in the other tag display area, before or after displaying the current page.

As shown in FIG. 2, the display 1 consists of the information viewing area 5 and the tag display area 6, 7 provided on the side of the information viewing area 5. For example, the electronic information display portion 11 draws the viewing information stored in the storage portion 4 in the information viewing area 5 of the display 1. Further, the tag display mode setting portion 15 specifies the tag display mode in accordance with the preselected setting. Subsequently, each tag display portion 12, 13 and 14 draws one sheet with tags 8, 9, 10 indicating the tag contents such as the page number appended in the tag display area 6, 7. The current page tag 8 appended to the current page displayed in the information viewing area 5 has desirably a specific appearance of color or shape with a highlighted font for the tag content such as the page number, for example, to easily distinguish it from other tags 9, 10.

Each tag 8, 9, 10 is arranged in accordance with the tag content such as the page number. To make the page arranging order of the page information clear, the absolute positional relation of information provided for the computer is clarified by drawing comically the overlapping condition of tags. For example, the tag 10 displayed in one tag display area 6 has a smaller page number than the page number of the current page. The tags are displayed in overlapping condition so that the tag having a greater page number is placed visually in front of the tag having a smaller page number. Further, the tag displayed in the other tag display area 7 has a greater page number than the page number of the current page. The tags are displayed in overlapping condition so that the tag having a greater page number is placed visually in the rear of the tag having a smaller page number.

As compared with the tag content such as the page number of the tag 8, 9, 10 appended in the information viewing area 5, the tag having a greater tag content such as page number is displayed in one tag display area 6, and the tag having a smaller page number is displayed in the other tag display area 7. Also, the tags 8, 9, 10 are displayed differently in appearance in accordance with the page number of tag, which is an effective drawing method for clarifying the relative positional relation of viewing information.

Figure 3:
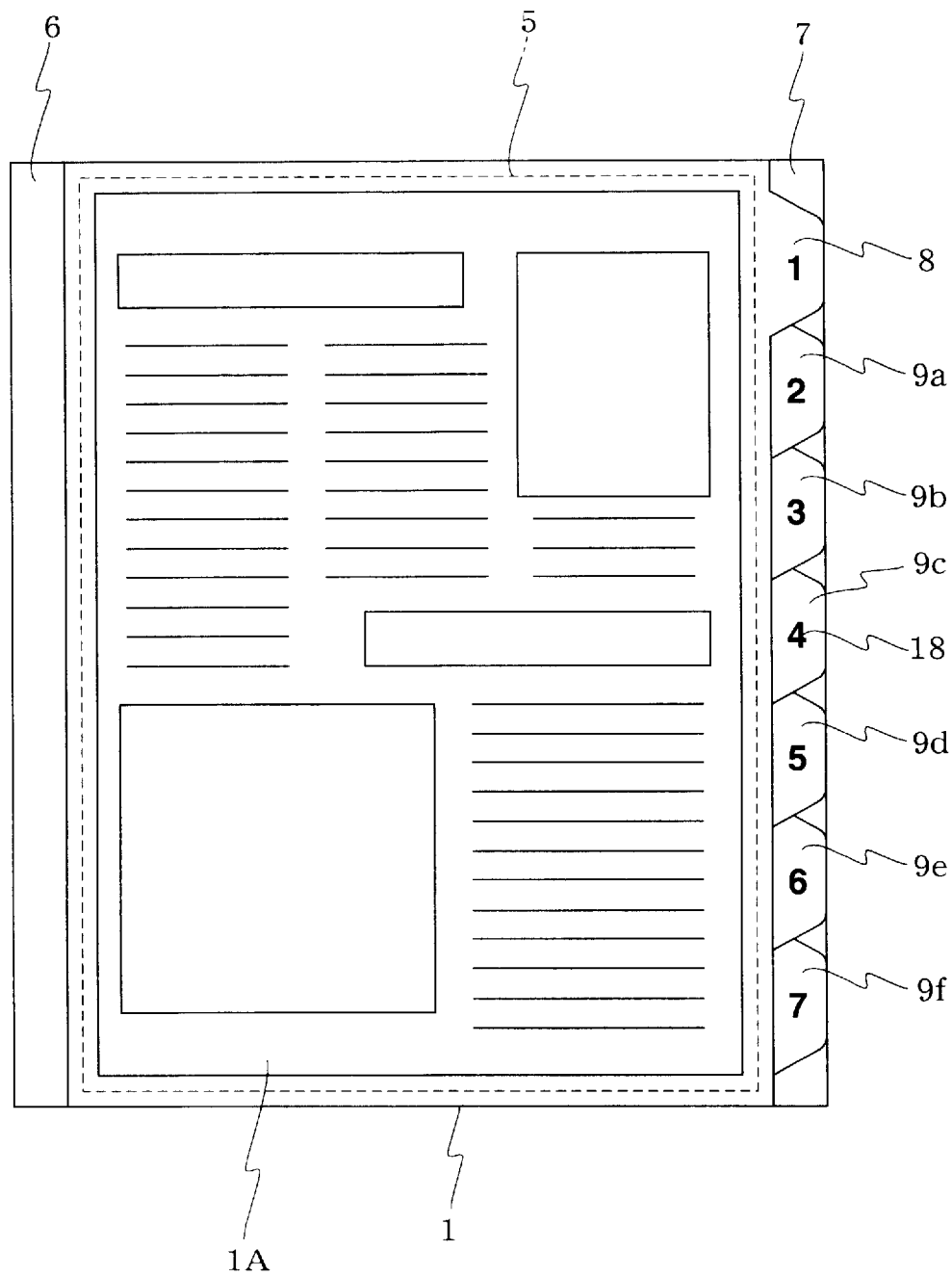
FIG. 3 is an explanatory view illustrating an initial state of tag display in this embodiment.
Figure 4:
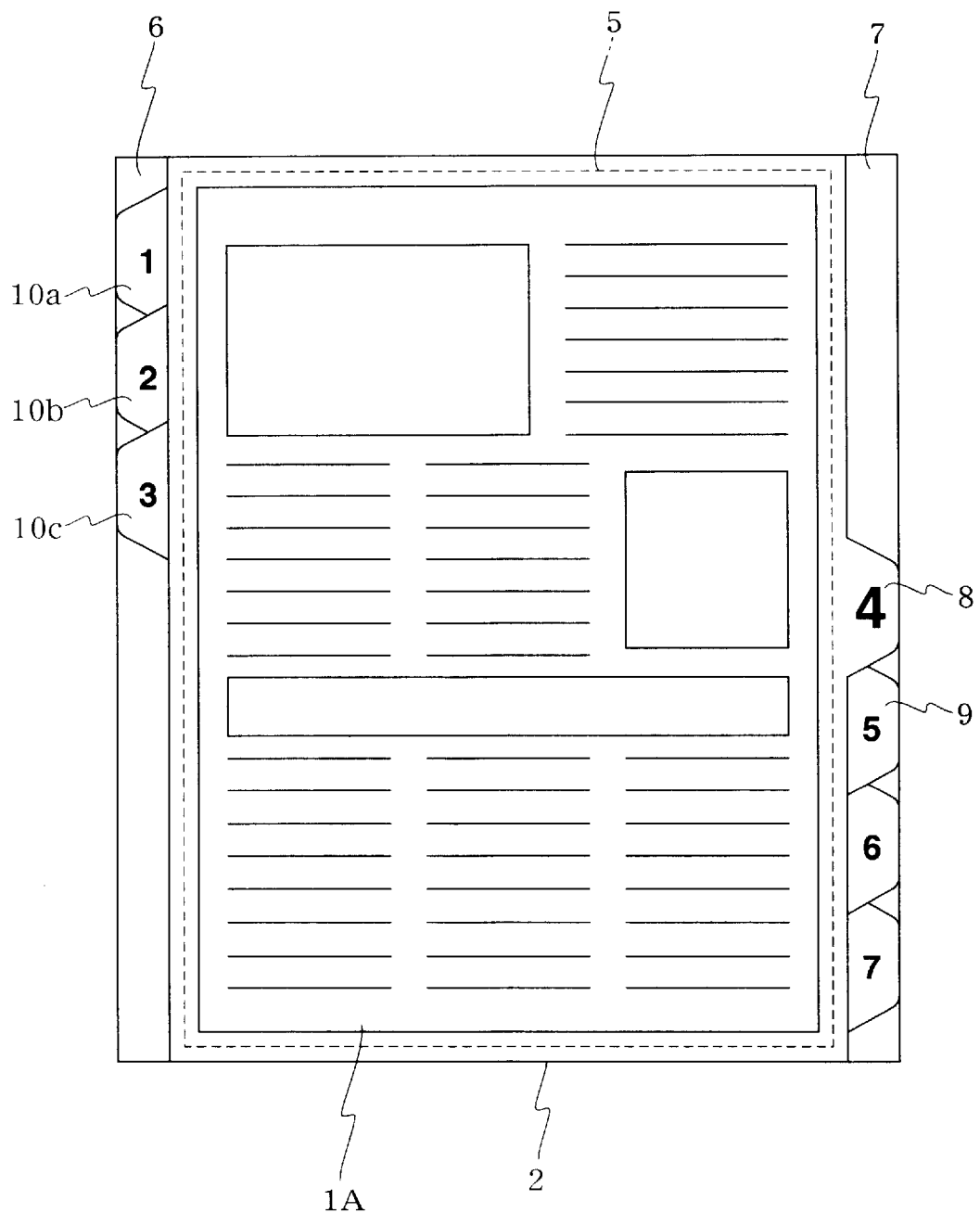
FIG. 4 is an explanatory view illustrating a tag display at the fourth page with the configuration as shown in FIG. 3.

FIG. 3 is an explanatory diagram showing an initial state of the tag display according to this embodiment of the invention. FIG. 4 is an explanatory diagram showing a tag display example in which the fourth page is displayed in the configuration as shown in FIG. 3. Herein, the display portion 1 has the information viewing area 5 and the tag display area 6, 7. The electronic information 1A stored in the storage portion 4 is displayed in the information viewing area 5 by reconstructing, as the page information in a unit of page, the amount of information which can be displayed in the information viewing area 5. The page information is data in a unit of page of predetermined size.

Also, the page information display device arranges the tags 8, 9, 10 in the order of the tag content 18 such as the page number, with each tag 8, 9, 10 appended to the extremity of each page marking the tag content 18 such as page number, to exhibit that the arrangement of page information has a linear information structure, so that the page information in a unit of page can be superposed in succession like a book.

In the example of FIG. 3, the total page number of electronic information is 7 pages. Seven tags having the length of the tag display area 7 divided by the page number 7 are displayed. In order to overlap the tags, as shown in FIG. 3, this tag length is equal to the length divided plus the overlapping length. Typically, for the tag 8 appendant to the current page, the height or position of tag in a tag display direction maybe determined, on the basis of the ratio of the page number of current page to the total page number of electronic information, at a step S2 of determining the current page tag height as shown in FIG. 2.

In the example as shown in FIG. 3, the page number of the page with the tag appended is displayed as the tag content indicated within the tag at a step S8 of displaying the page number. Accordingly, the number appended to the tag in FIG. 3 is the page number of electronic information. As shown in FIG. 3, even in the case where the page information is viewed using only one information viewing area 5, the tag having the page number is displayed in the tag display area, so that the user can see intuitively the total amount or depth of electronic information. And in the example of marking the tags 8, 9, 10 with the page number, unlike the tag having the heading information marked, there is no problem that the page number can not be fully written in the tags 8, 9, 10. Of course, if there is a sufficient space in the tag display area 6, 7, an icon suggesting the content of character information or page information may be attached.

Before or after the step S8 of displaying the page number, the current page tag 8 may be highlighted. In the example as shown in FIGS. 3 and 4, the bold character is used as the font of current page tag.

Referring to FIGS. 3 and 4, the overlapping of tags will be described below. Firstly, with respect to the current page tag 8, the succeeding page tags 9a to 9f are lower level tags. The order is such that the tag is at lower level as the page leaves away from the current page. Accordingly, the current page tag 8 is at the uppermost level. And the tags 9a, 9b, ..., 9f are placed at lower level in the order of 9a, 9b, ..., 9f. The overlapping of tags is such that the lowermost tag 9f is at the lowest level, and the tags are overlapped in the order of 9e, 9d, ..., 9a. Thus, the user can understand the structure from the current page to the seventh page at a glance. In a case where there is an operation of viewing the fourth page, the preceding page tags are transferred to the one tag display area 6 in this embodiment, as shown in FIG. 4, rather than changing the overlapping relation only in the other tag display area 7. Thereby, the position of current page relative to the total page number of electronic information can be quickly and correctly informed to the user.

As shown in FIG. 4, among the preceding page tags 10, a tag 10c indicating a previous page (third page) of the current page is at the uppermost level, and the tag having smaller page number is placed at the lower level. Thereby, the depth of electronic information can be represented. After all, the hierarchical relation is such that the current page is at the uppermost level, and the page is positioned at lower level as the absolute value of a difference between the page number of the page and the current page number increases. Therefore, at a step (S9 in FIG. 9) of defining the tag relation, the current page tag 8 or the page tag preceding or succeeding the current page is at the uppermost level, and the page is positioned at lower level as the absolute value of a difference between the current page and the page for appending the tag increases. And at a step (S14 in FIG. 9) of setting the overlapping, the upper level tag overlaps the lower level tag in the one or other tag display area in accordance with the hierarchy of the page defined at the step of defining the tag relation. To clarify the order of arranging the pages, the depth of page can be visualized on the tag display area 6, 7 by comically drawing the overlapping of tags. In this way, in this embodiment, the tag 8, 9, 10 indicating the tag content 18 such as the page number is appended to the page information, which is then displayed in the tag display area 6, 7. Using an input unit 2, the tag 8, 9, 10 can be directly designated. The page information corresponding to the tag content 18 such as the page number for the tag 8, 9, 10 is displayed in the information viewing area 5. Then, the display mode for the tag 8, 9, 10 appended to the page information is changed, thereby making it possible to easily grasp the amount of information or the information structure provided for the computer. This is because the comparison between the number of tags in one tag display area 7 and that in the other tag display area 7 is visually easily made as shown in FIG. 2.

Further, in this embodiment, it is also possible to detect an input operation for viewing such as rolling the page in the information viewing area 5. For example, using a pointing device for the input operation with a fingertip such as a touch panel over the tag display area 6, 7 for input, there is provided a user interface which enables a viewing operation to be performed intuitively with the gesture of rolling the page.

Figure 5:
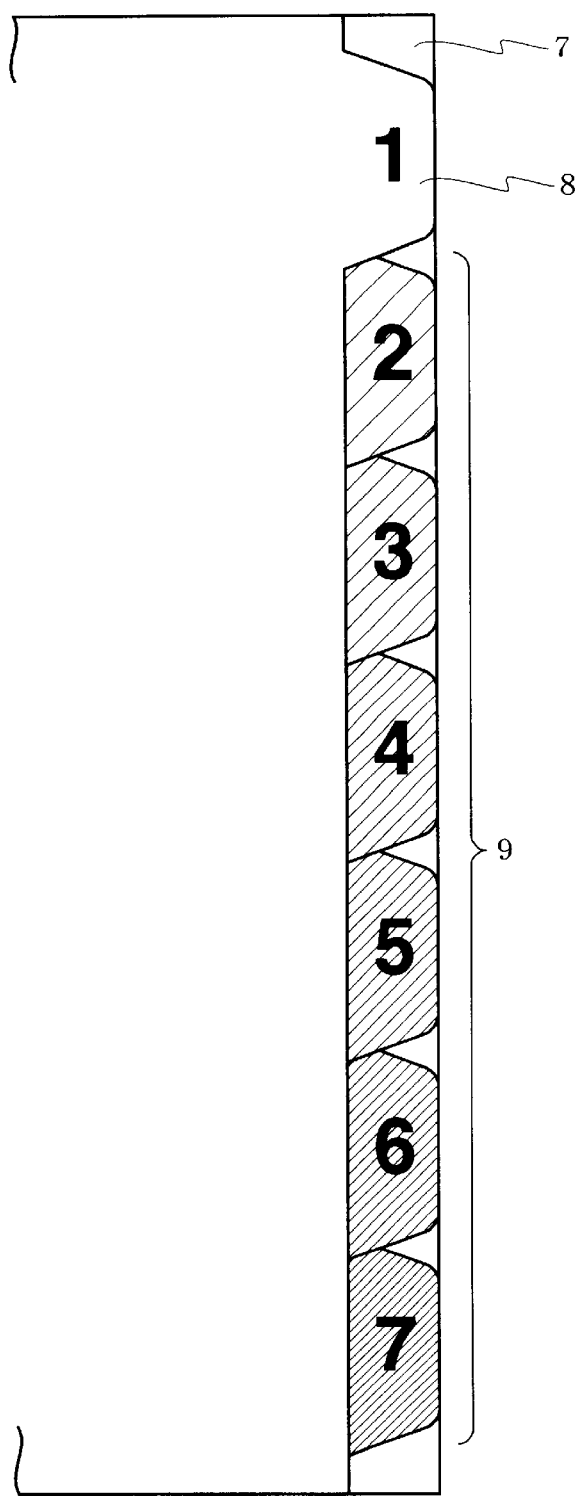
FIG. 5 is an explanatory view illustrating this embodiment in which the tag colors are varied.

FIG. 5 is an explanatory diagram showing the variation of tag color according to this embodiment. In an example of FIG. 5, subsequently to the step S4 of displaying the current page, a step of setting the tag color variation is provided to vary the color for the tags appendant to the preceding or succeeding pages as the absolute value of a difference between the current page and the page to append the tag increases, or the hierarchy is at lower level. In the example of FIG. 5, the color is denser at lower hierarchical level.

Figure 6:
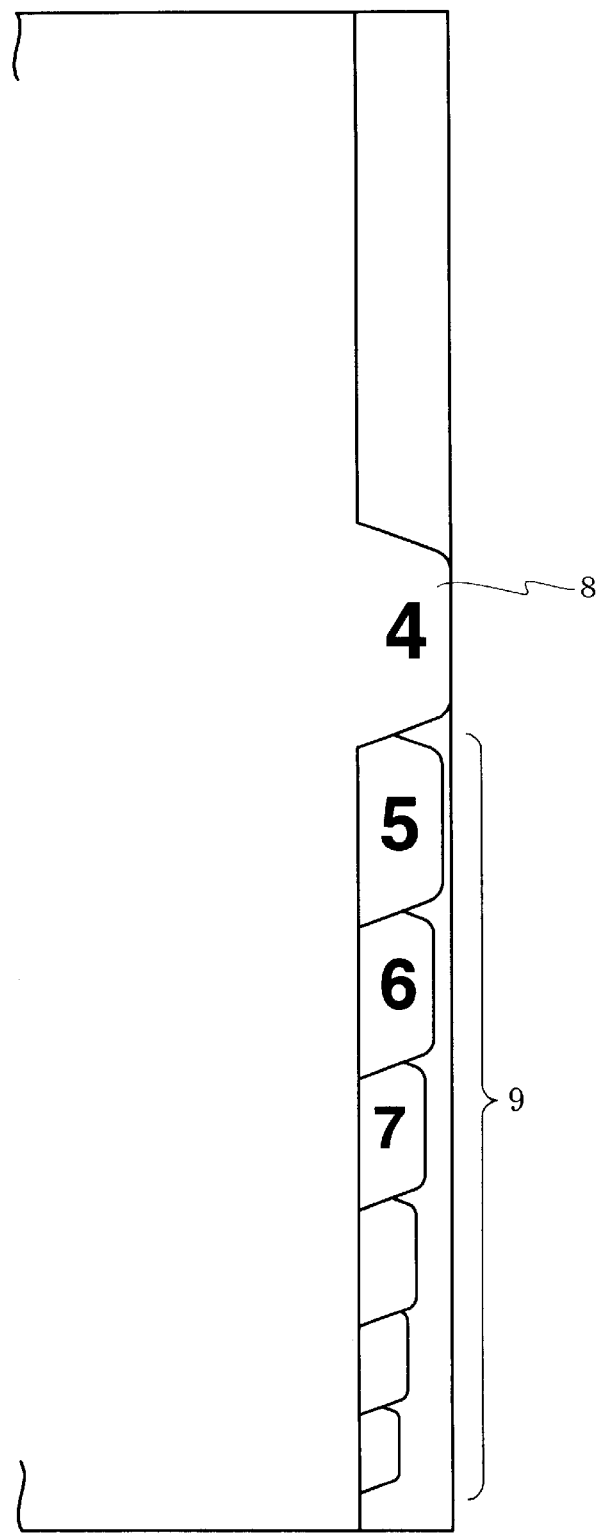
FIG. 6 is an explanatory view illustrating this embodiment in which the shape of tag is changed in its width direction.
Figure 7:
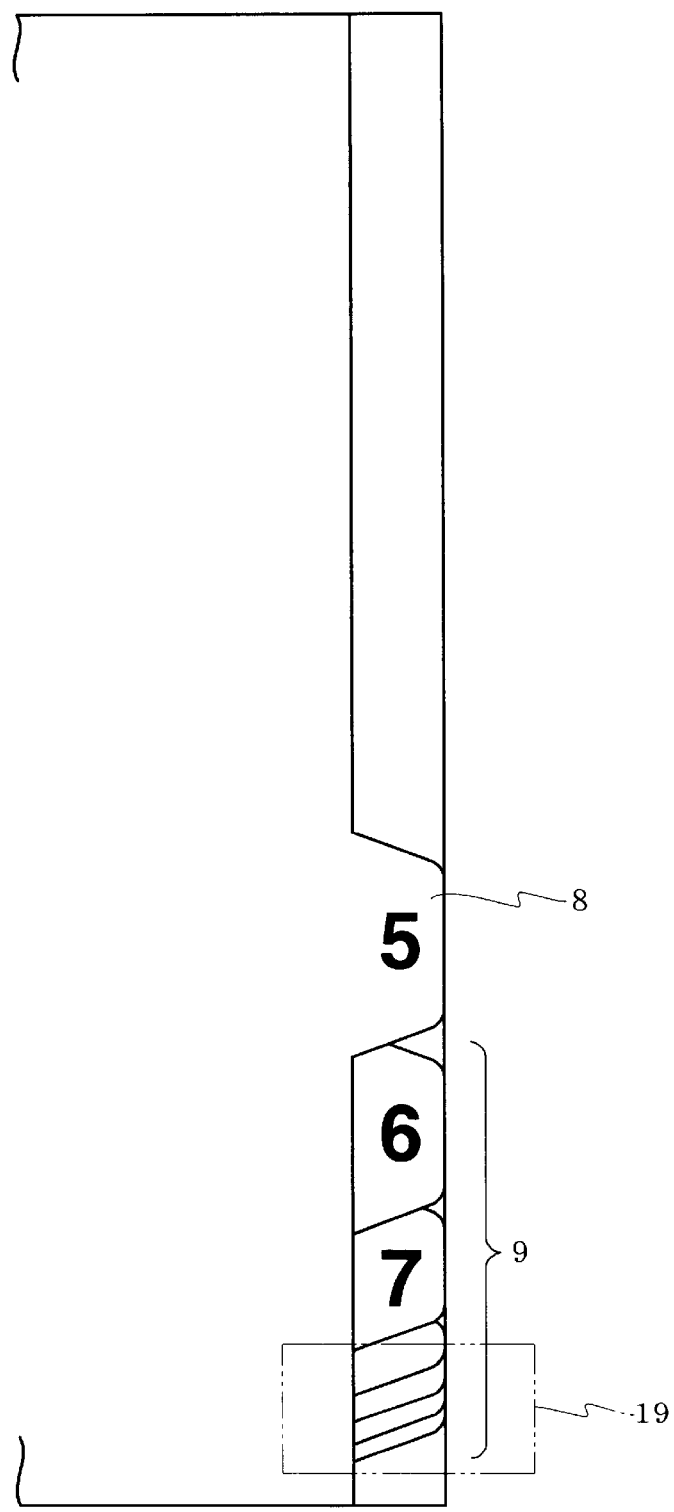
FIG. 7 is an explanatory view illustrating this embodiment in which the shape of tag is changed in its length direction.

FIG. 6 is an explanatory diagram showing the variation of tag shape in the width direction. FIG. 7 is an explanatory diagram showing the variation of tag shape in its length direction according to this embodiment. In the examples as shown in FIGS. 6 and 7, subsequently to the step S4 of displaying the current page, a step of changing the tag shape is provided to change the shape of tag more greatly as the absolute value of a difference between the current page and the page number of the page to append the tag increases. In an example of FIG. 6, the width of tag 9 is made narrower successively from the current page tag 8 to represent the depth. On the other hand, in an example of FIG. 7, the length of tag 9 is made shorter successively from the current page tag 8 to represent the depth of electronic information. In this example, particularly when the total page number of electronic information is large, the tag is represented by the line as indicated by numeral 19 to prompt the user to understand intuitively the total page number.

Figure 8A:
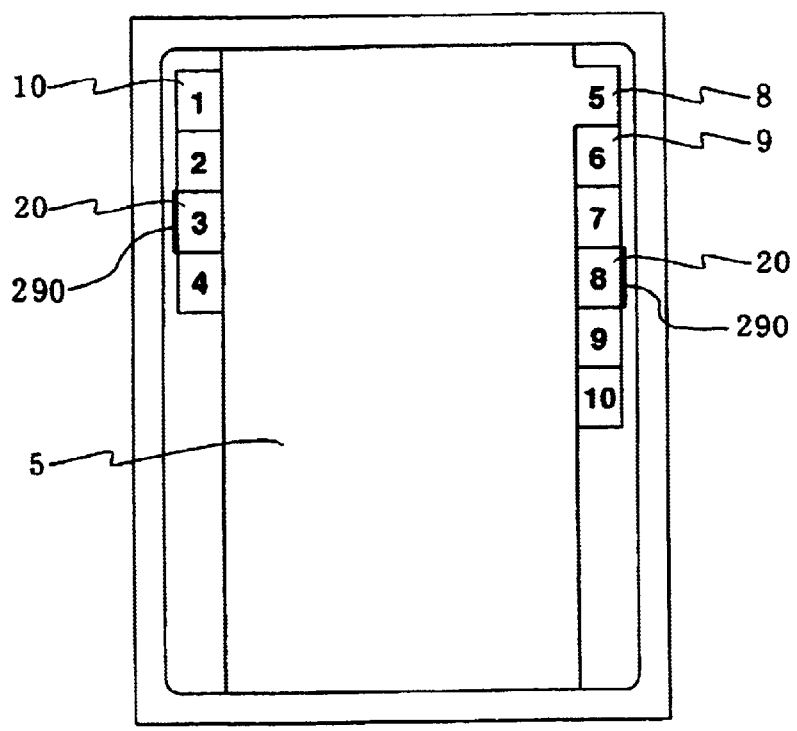
FIG. 8A is a view showing the tags of square shape having the same tag length.
Figure 8B:
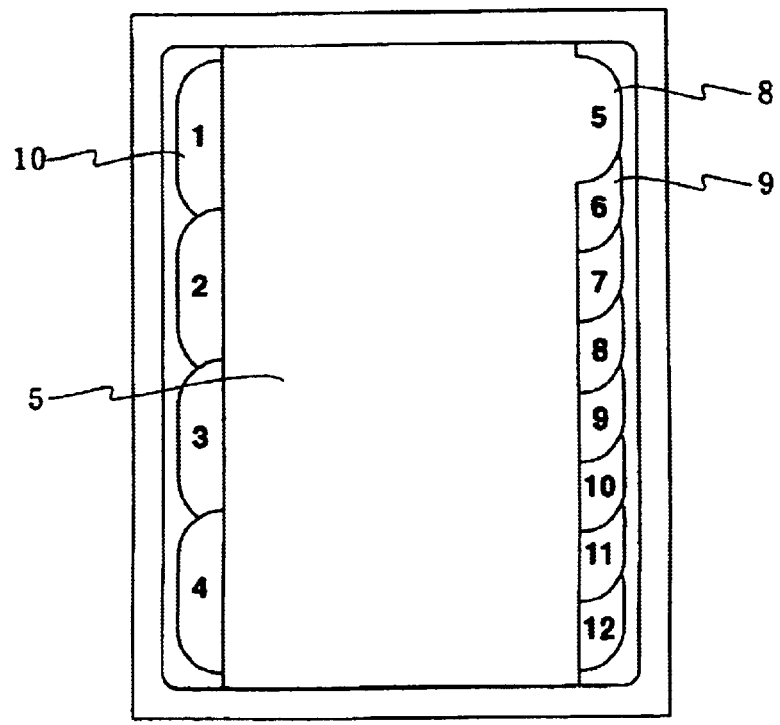
FIG. 8B is a view showing the tag display area which is fully allocated to the preceding and succeeding page tags.

In the above example, the tag shape is trapezoid, and the tags are displayed after rolling the page not to overlap in a height direction in the left or right tag display area, or while maintaining the height of tag as shown in FIG. 3. However, a method of displaying the tags from the upper end successively with a fixed tag length, as shown in FIG. 8A, or a method of displaying the tags with a uniform tag width as shown in FIG. 8B may be adopted. The tag shape may be rectangular as shown in FIG. 8A, or elliptical or oval as shown in FIG. 8B. In addition to highlighting the tag by the font of tag content, the page having the information preselected by the user for the tag of page other than the current page maybe highlighted by the tag shape of the bold line 290. Thus, in the case where the newspaper article is provided as the electronic information, the international page may be highlighted.

Figure 9:
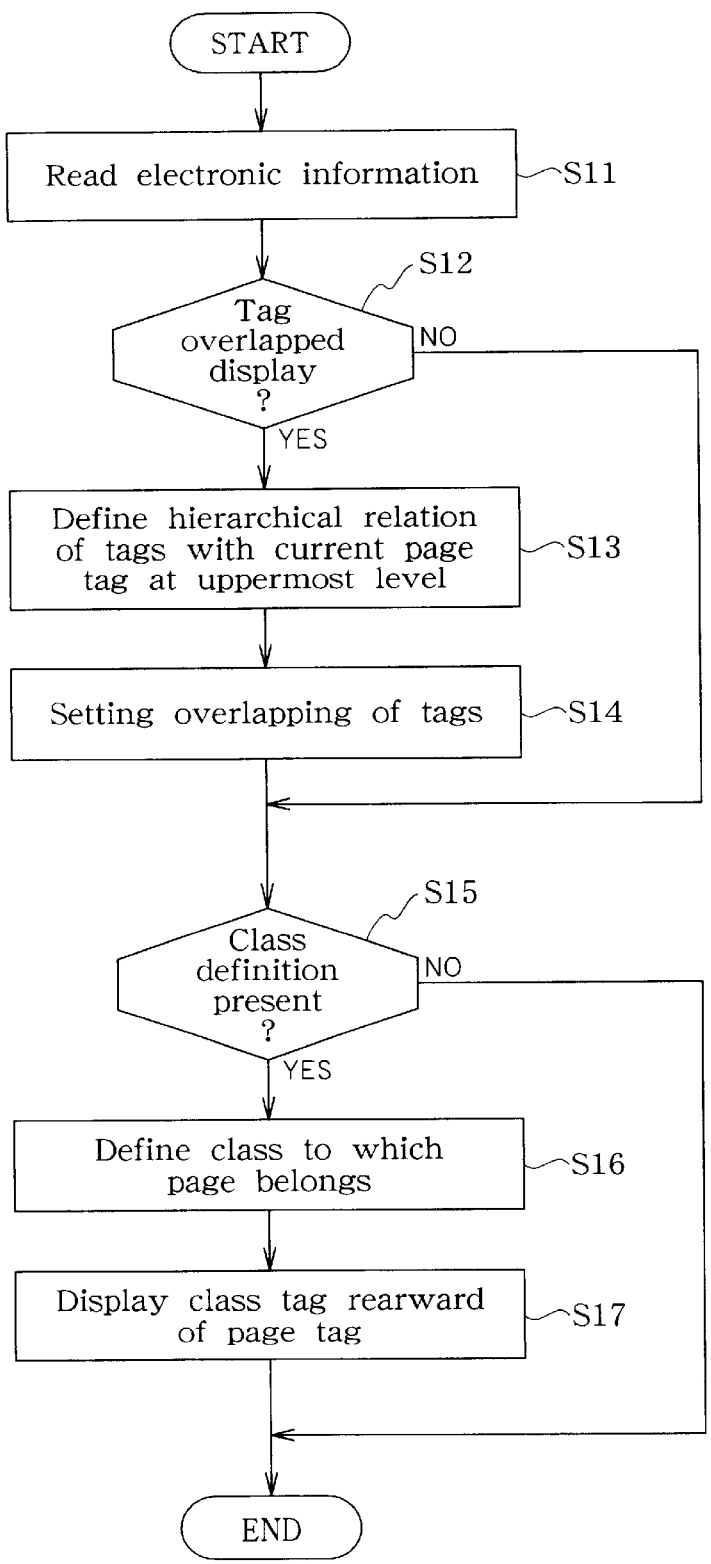
FIG. 9 is a flowchart illustrating a tag overlapping display and a class tag display in this embodiment.

FIG. 9 is a flowchart showing the tag overlapping display and the class tag display according to this embodiment. In an example of FIG. 9, the tag is displayed in accordance with the setting of the tag display mode. For example, it is checked whether or not the tag overlapping display is effected (step S12). If the overlapping display is made, the hierarchical relation is defined (step S13) and the setting of overlapping is made (step S14).

In this example, when each tag belong to any of a plurality of classes, it is checked whether or not the class tag is displayed with the normal tags 8, 9, 10 (step S15). If the class tag is displayed, firstly the relation of each tag belonging to the class is defined (step S16 of defining the due class). Subsequently, a tag (class tag or heading class) indicating the content of class to which the tag of the page displayed in the tag display area 5, 7 belongs is displayed in each tag display area (step S17 of displaying the class tag).

Figure 10:
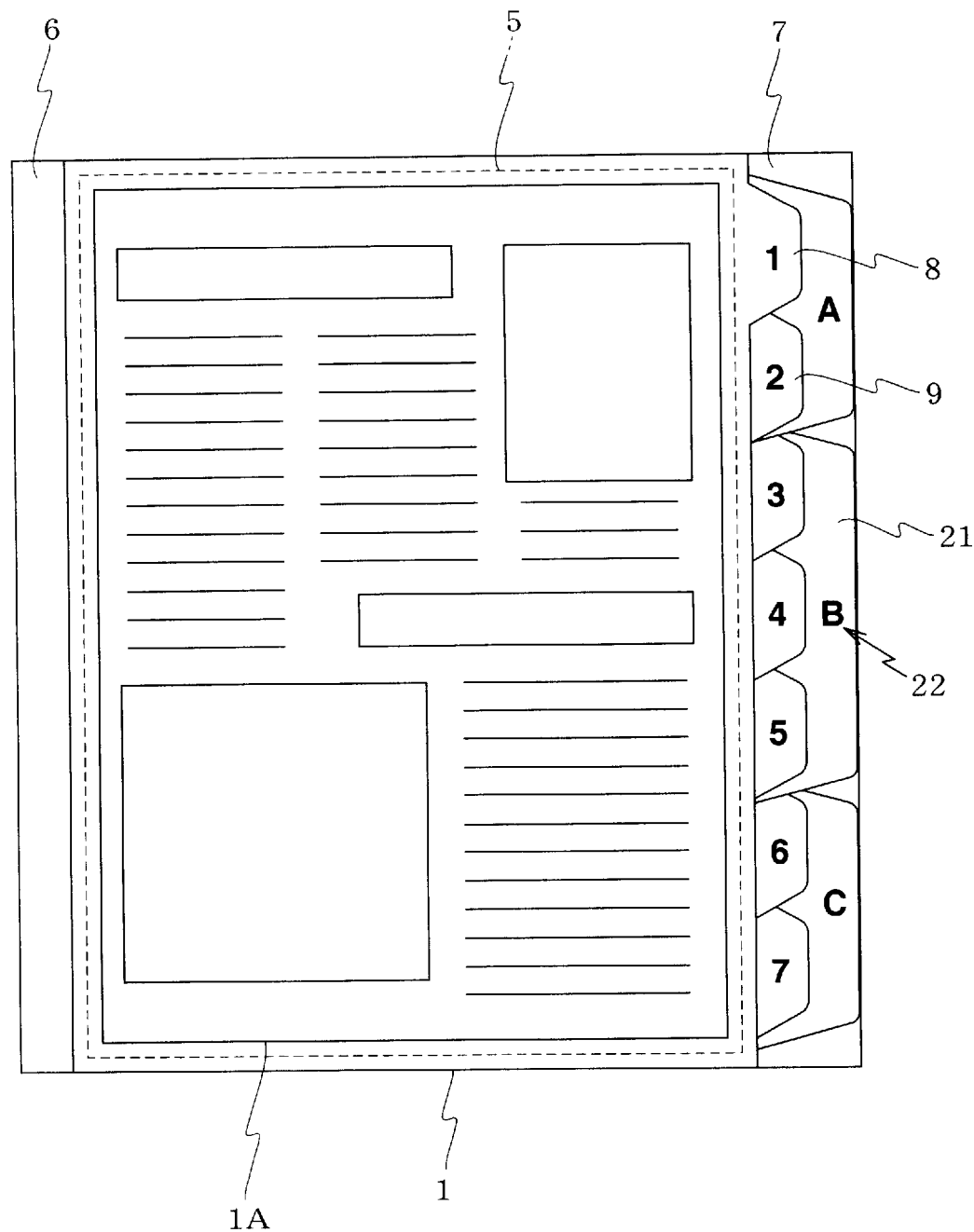
FIG. 10 is an explanatory view illustrating the class tag displayed in the tag display area in the configuration as shown in FIG. 9.
Figure 11:
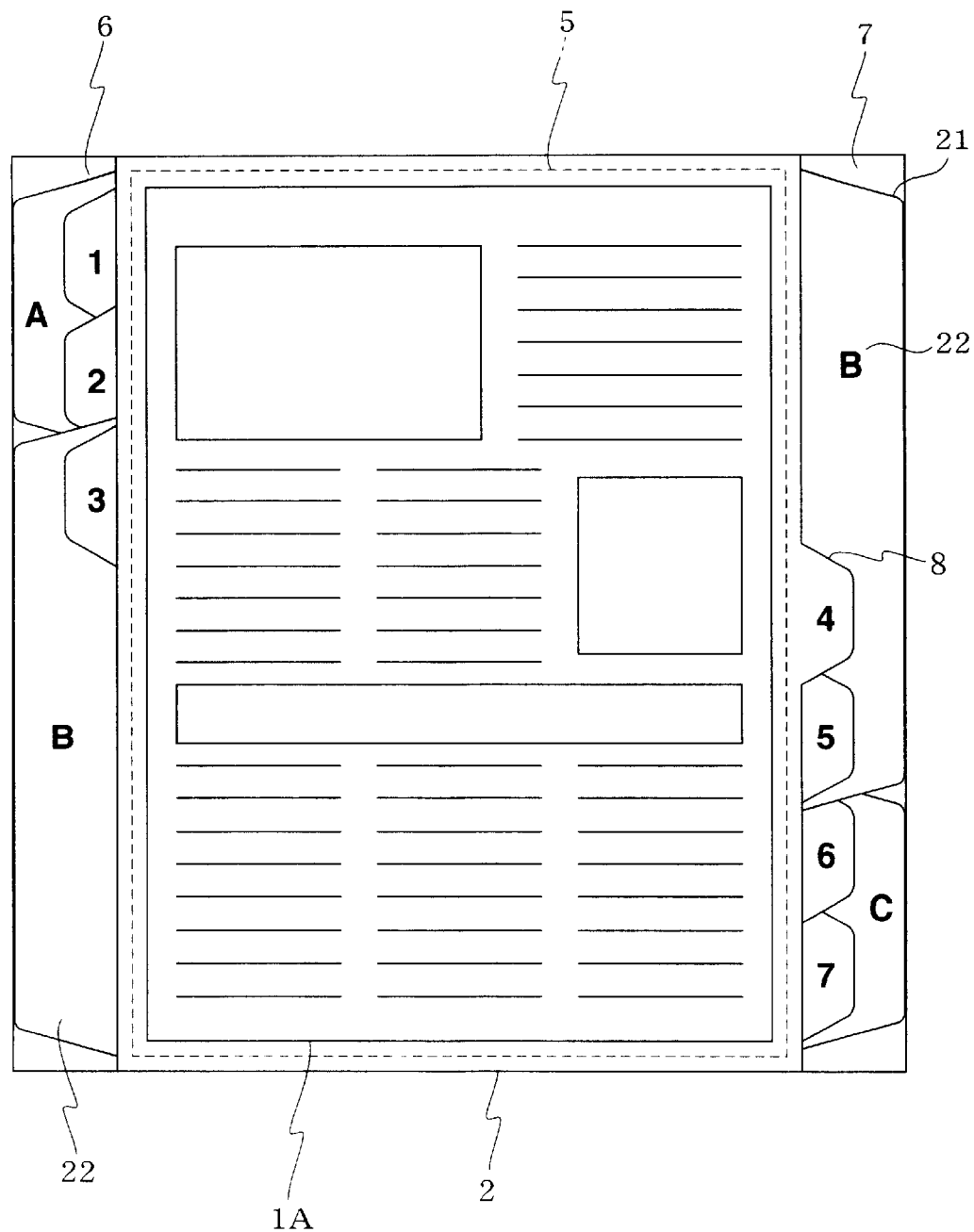
FIG. 11 is an explanatory view illustrating the fourth page displayed in the configuration as shown in FIG. 10.

FIG. 10 is an explanatory diagram showing the class tag displayed in the tag display area according to the configuration of FIG. 9. FIG. 11 is an explanatory diagram showing the display of the fourth page. As shown in FIG. 10, the total page number of electronic information is 7 pages, of which the tags belong to class A, class B or class C. Herein, to clarify the end of a certain class, a class tag 21 is made to overlap a next page tag at the time of end. Then, it is clear that the third page is next to the second page, and to the class A. The fourth page belongs to the class B. Further, the third page having a precious page tag is displayed in one tag display area 6. Hence, the tag 21 for the class B is displayed left and right.

Figure 12:
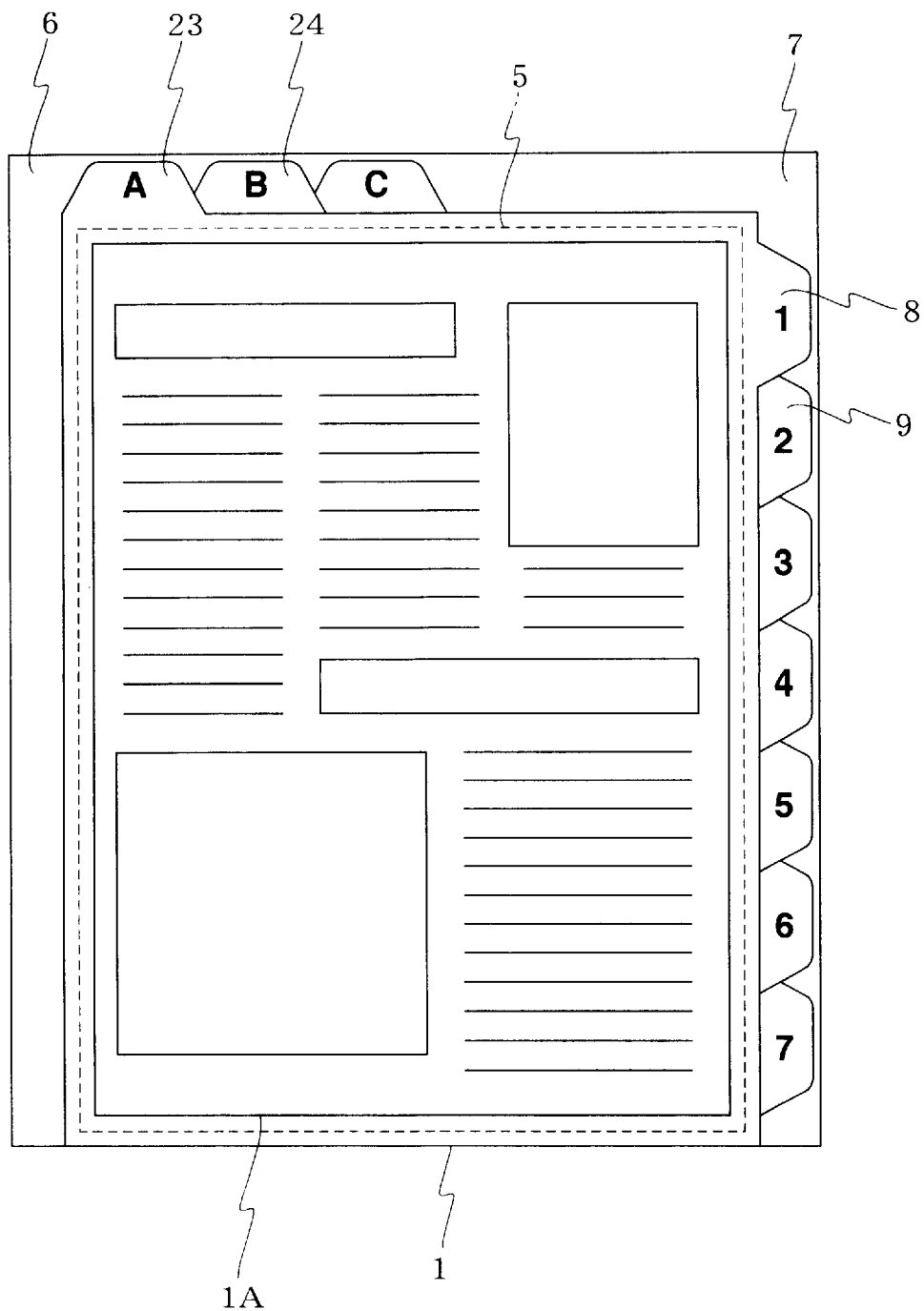
FIG. 12 is an explanatory view illustrating the class tag displayed out of the tag display area in the configuration as shown in FIG. 9.

The display of class tag may be made over the normal tags 8, 9, 10 in the tag display area 6, 7, or made in a class tag display area provided other than the tag display area. FIG. 12 is an explanatory diagram showing the class tag displayed in the upper area other than the tag display area according to the configuration of FIG. 9. The display of the class tags 23, 24 in this upper area may occur always during the display of page information, or may be made only when there occurs a pointer event of a pointer approaching to the upper end of the information viewing area. In the examples as shown in FIGS. 10 to 12, the class name is displayed as the tag content of class tag. Otherwise, a mark or character may be displayed. If the electronic information has a chapter defined, the chapter number may be displayed as the tag content of class tag, with the chapter as one class.

Figure 13:
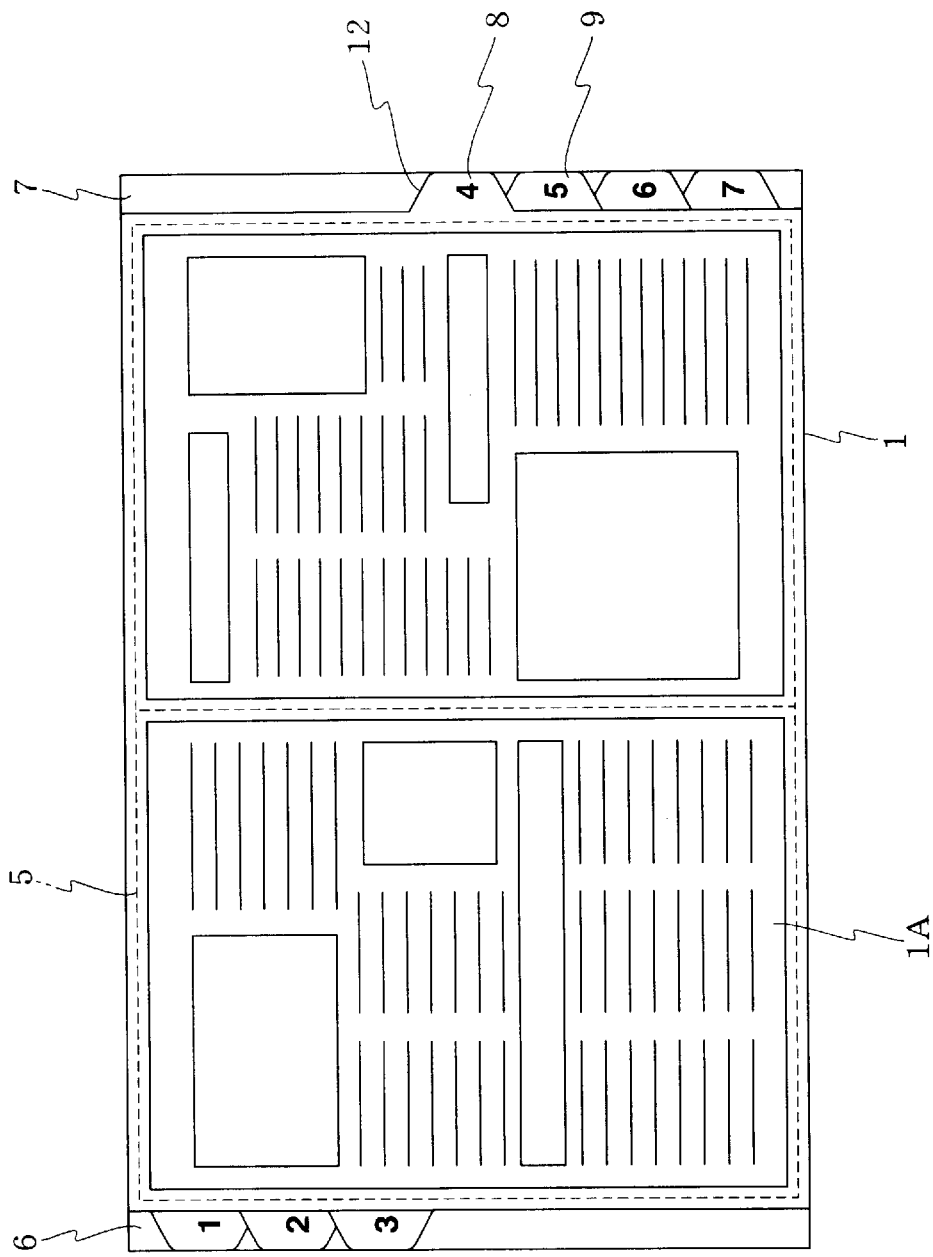
FIG. 13 is an explanatory view illustrating two pages of information displayed in the information viewing area according to this embodiment.
Figure 14:
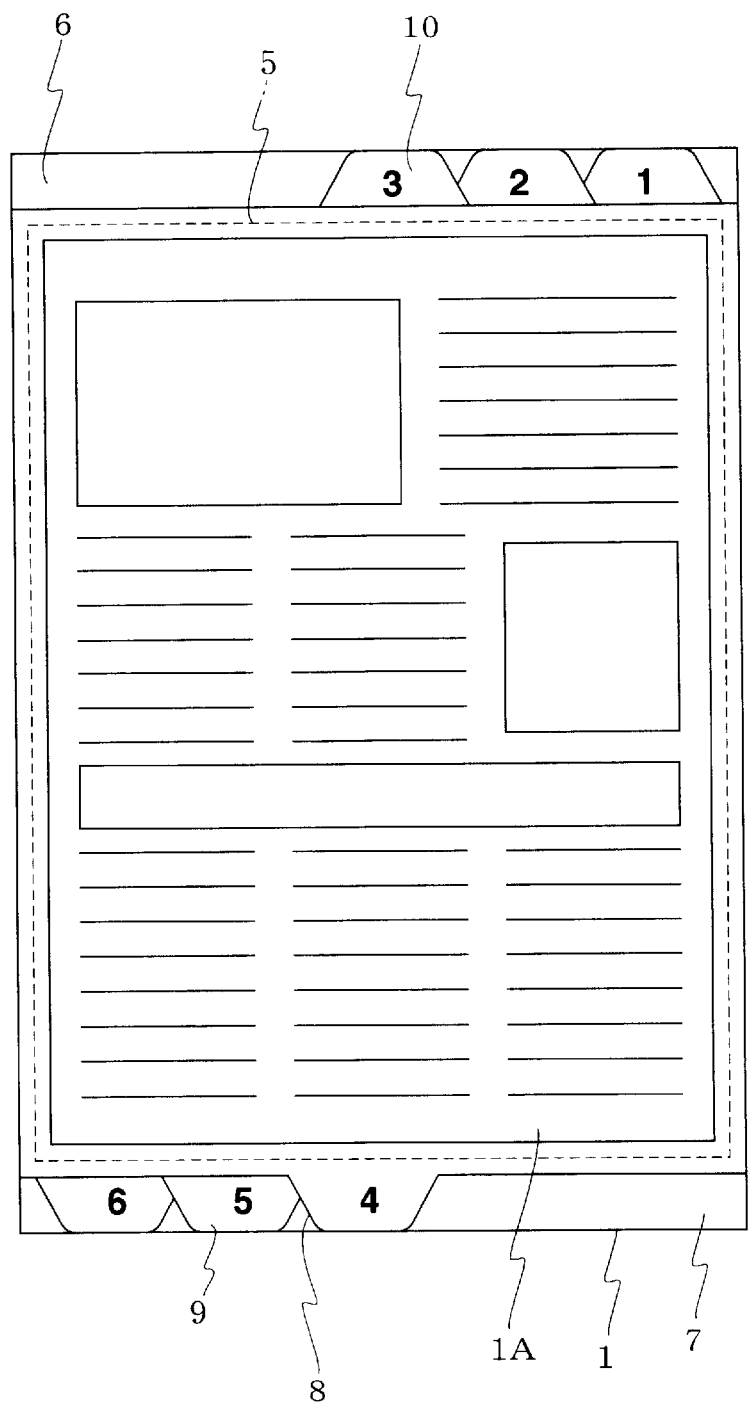
FIG. 14 is an explanatory view illustrating the tag display area on the upper and lower sides according to this embodiment.

In the above examples, to display one page of electronic information lengthwise, a longitudinal display is used. However, a lateral display may be used to display two pages of electronic information. A tag display example in such a case is shown in FIG. 13. The tag display area 6, 7 is not only provided in the left and right areas, but also may be provided on the upper and lower areas, as shown in FIG. 14. In an example of FIG. 14, the current page tag is displayed in a lower tag display area 7, and the preceding page tag 10 is displayed in an upper tag display area.

As described above, according to this embodiment, a viewing area and an operation area are provided in the display area on an output device of the computer to enable the electronic information displayed in the information viewing area to be fully listed. Further, the amount of information which can be displayed in the information viewing area is drawn by appending the tag indicating the page number to the electronic information in a unit of page, with the overlapping of tags. Therefore, the user can easily grasp visually the electronic information arranged for every page. Thus, the user unfamiliar with the computer can also easily understand the information structure in the order of pages for the electronic information.

According to this embodiment of the invention, the user can easily grasp visually the absolute position of the page being currently viewed with respect to the amount of information provided for the computer in the order of arranging the tags. And the user can also easily grasp the relative position between the page or chapter being currently viewed and the arbitrary page or chapter, using the order of arranging the tags.

EXAMPLES

The examples of the present invention will be described below with reference to the drawings. Referring first to FIG.

15, some terms used in the present specification are defined. Subsequently, referring to FIGS. 16 to 18, the overall operation of each example will be described. Further, a first example of displaying the tag in the information viewing area will be first described. And then, a second example of displaying the tag after rolling the page will be described. Subsequently, a third example of rolling the page through the use of the tag will be described. Other related techniques will be described including the process of rolling the page and the method of producing the page information for use in each example.

Figure 15:
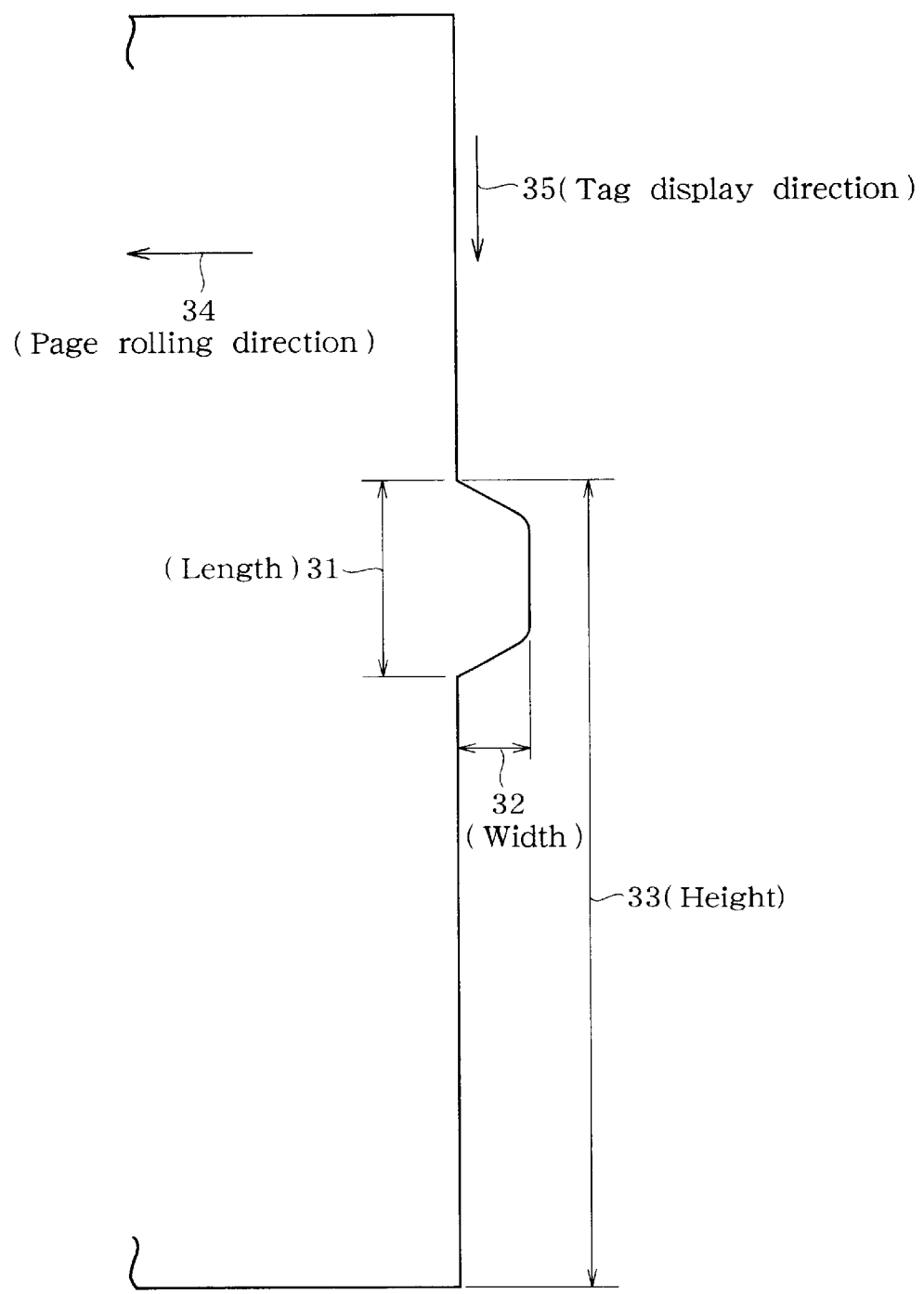
FIG. 15 is an explanatory view for defining various technical terms for use in an example of the present invention.

FIG. 15 is an explanatory diagram for defining the terms such as "tag width" for use in the present specification. Normally, in the English text or Japanese text written laterally, the characters are written from left to right and the page is rolled from right to left. On the other hand, for the Japanese text written vertically, the page is rolled from right to left. Also, in the case where the A4 sheets of paper for a report are fastened at the upper side, the page is rolled from bottom to top. In this way, the direction of rolling the page may exist in the books, reports or magazines. Herein, a term "page rolling direction" referred to above means one direction as indicated by reference numeral 34, or a direction of rolling the page from right to left in FIG. 15. The page rolling direction is typically parallel (or antiparallel) to the character writing direction, or orthogonal to it. And, in this example, a term "tag display direction" is defined as a direction orthogonal to the page rolling direction. The tag is displayed along this tag display direction 35. When rolling the page from right to left, the tag display direction is from top to bottom. When rolling the page from bottom to top, the tag display direction is from left to right as shown in FIG. 14.

Herein, a term "tag length" is defined as a length from the start point of tag to the end point in the tag display direction. A term "tag width" is defined as a length of tag in the page rolling direction. Accordingly, if the tag length and the tag width are determined, the size required to display one tag can be determined. In this example, also, the position of arranging the tag is variable along the tag display direction, depending on various elements. Herein, a term "tag height" can be defined as a length from one end point in the tag display direction. When the tag is trapezoid, the elements specifying one tag are "tag length", "tag width" and "tag height", as far as the angle of trapezoidal side face is determined.

Figure 16:
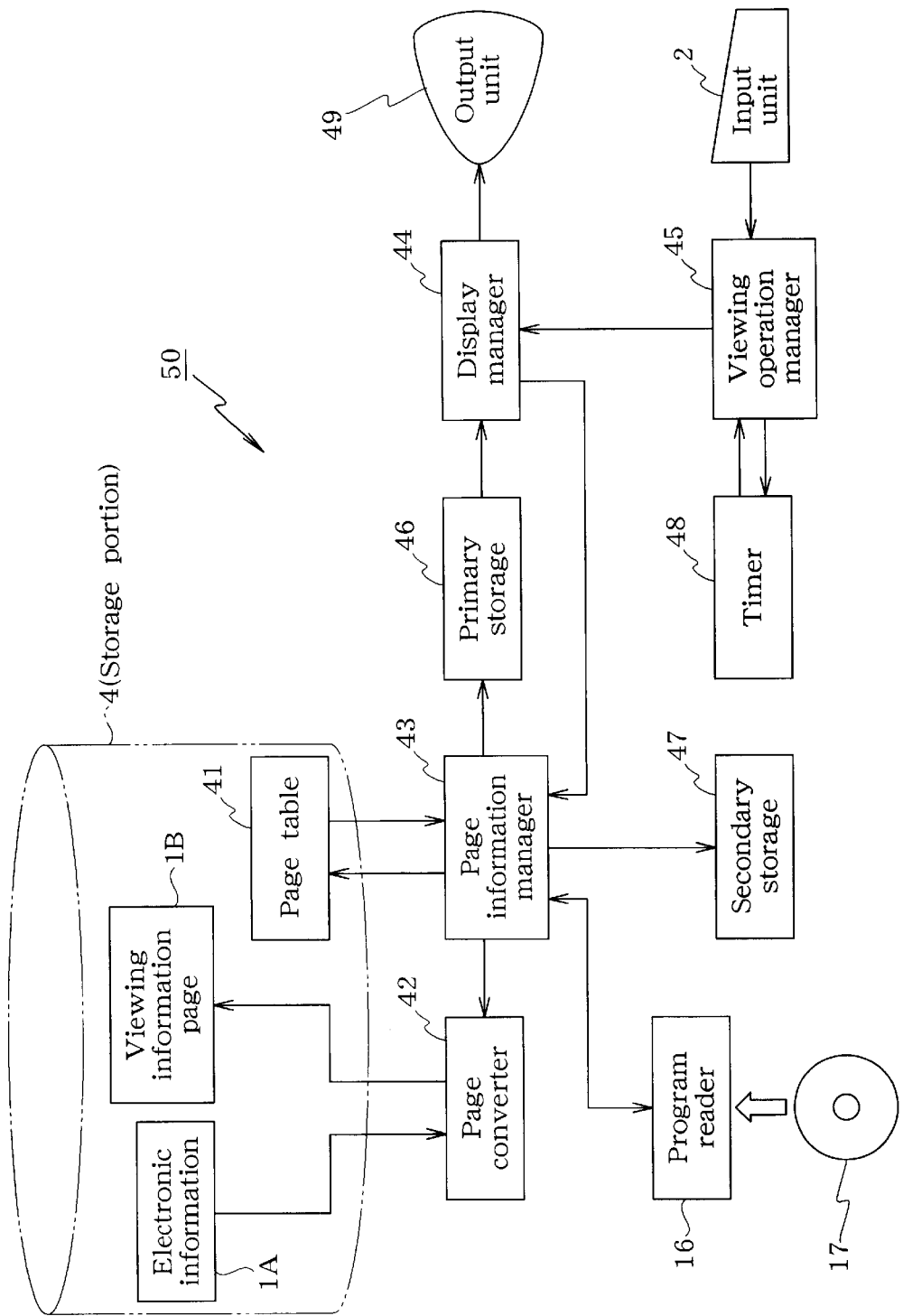
FIG. 16 is a block diagram showing the configuration of this example.

FIG. 16 is a block diagram showing the configuration of this example, which is common to the first to third examples. A page information display device of this example comprises an input unit 2 for inputting a pointer event and a storage portion 4 for storing a variety of sorts of information, as shown in FIG. 16. An output unit 49 is provided along with a display manager 44 which is a display driver for controlling this output unit 49 and a primary storage portion 46 for storing the image data of one screen or two screens on the display portion. Also, the input unit 2 is provided along with a viewing operation manager 45 for issuing a viewing operation command to the display manager, on the basis of a pointer event which has occurred in the input unit 2, and a timer 48 for clocking the elapsed time during this viewing operation.

The storage portion 4 stores the page information and the tag displayed on a display 1, the electronic information 1A which is the page information of plural pages, the page information 1B having the amount of information by which the electronic information 1A can be displayed in the information viewing area 5 in a unit of page, and a page table 41 containing the configuration of this viewing information 1B. The storage portion 4 has the electronic information 1A stored in a universal file format such as a text format, a word processor document format, an image format, an HTML format, an XML format, a PDF format, or a scanned image format. of course, the electronic information 1A described herein is available, even when it is stored in a storage device at the remote location which is connected via telephone line or a network such as LAN. Such electronic information 1A is converted into a liner image file by a page converter 42 in this example. For example, if the image data is one file for each page, the display process can be facilitated. In this case, the page information is in the image format which is a bit map format, a TIFF format, a PICT format, a JPEG format, or a GIF format. The page table 41 has index information in which the tag content 18 such as page number corresponds to the page information one to one. Since the page information involves image information, the viewing information is passed through the page converter 42 having a copyright protection feature to embed an electronic openwork. This process can be easily implemented on the configuration of the page information display device. Also, a page information manager 43 manages the data structure or order of the viewing information 1B which is then converted by the page converter 42 with reference to the page table 41. In the example of displaying the newspaper, more articles of information may be possibly defined within one page of page information.

The page information display device in this example comprises a high speed primary storage 46 for display, a secondary storage 47 which functions as a prefetch cache for display, and the page information manager 43 for managing the predetermined page information to be read from the storage portion 4 in accordance with the page being displayed at present or the viewing operation and stored in the secondary storage 47. These can improve the responsibility to the viewing operation.

Figure 31:
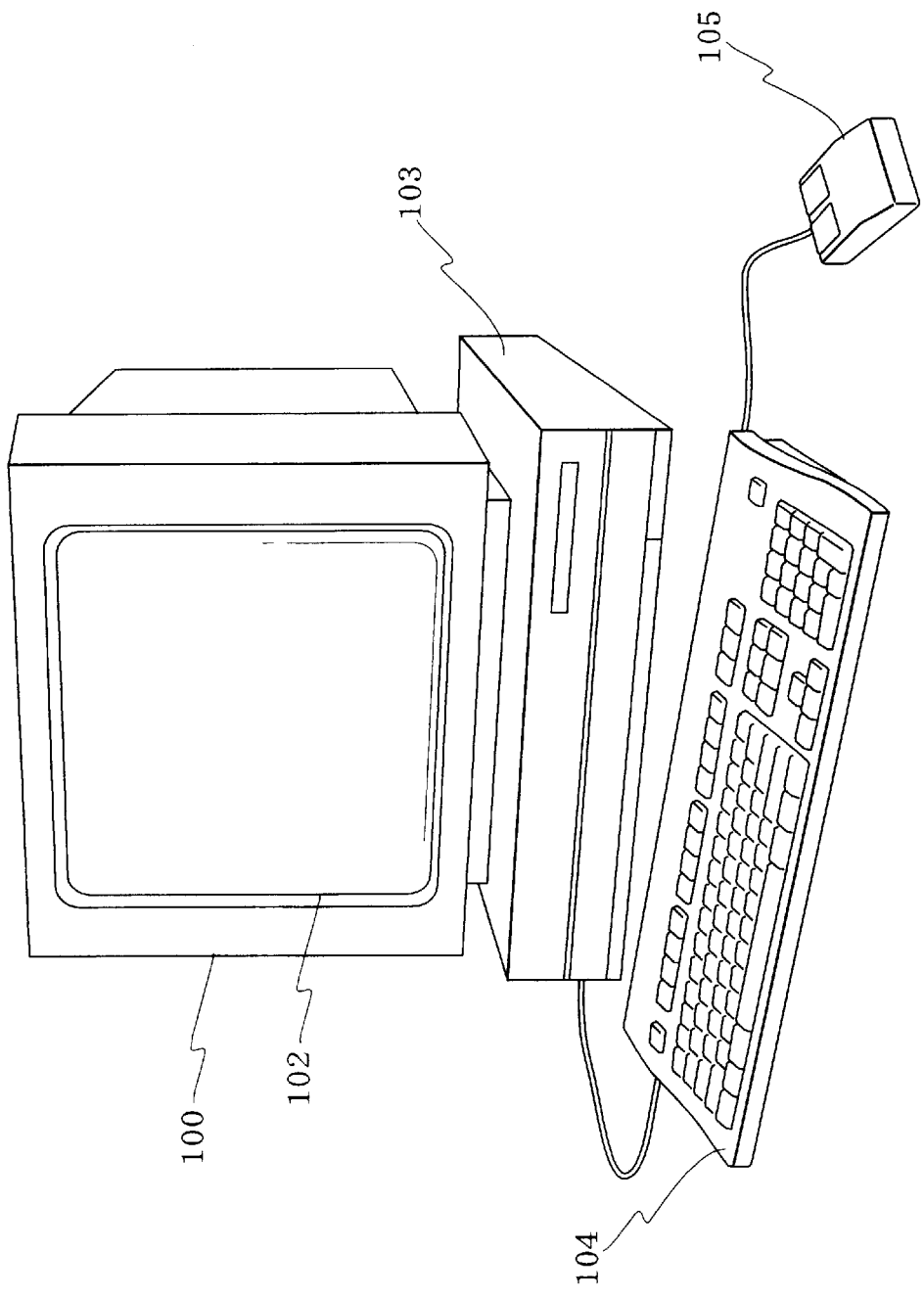
FIG. 31 is a perspective view illustrating a computer for use in this example.

In order to transform into electronic data the information which is conventionally printed on the paper to enable viewing to the information intuitively, the input unit 2 may be a device which enables the input operation to be made, while simulating the sense of rolling the page of a book with a fingertip as faithfully as possible, such as a touch panel, in this example. And the display 1 maybe at high-resolution. It is preferable that an input area of the input unit 2 covers the tag display area 6, 7 of the display 1, thereby providing the input area and the tag display area 6, 7 integrally. Of course, with a computer configuration as shown in FIG. 31, viewing of electronic information is enabled sufficiently. This does not necessarily mean that the touch pane or the high resolution output device must be used.

Figure 17:
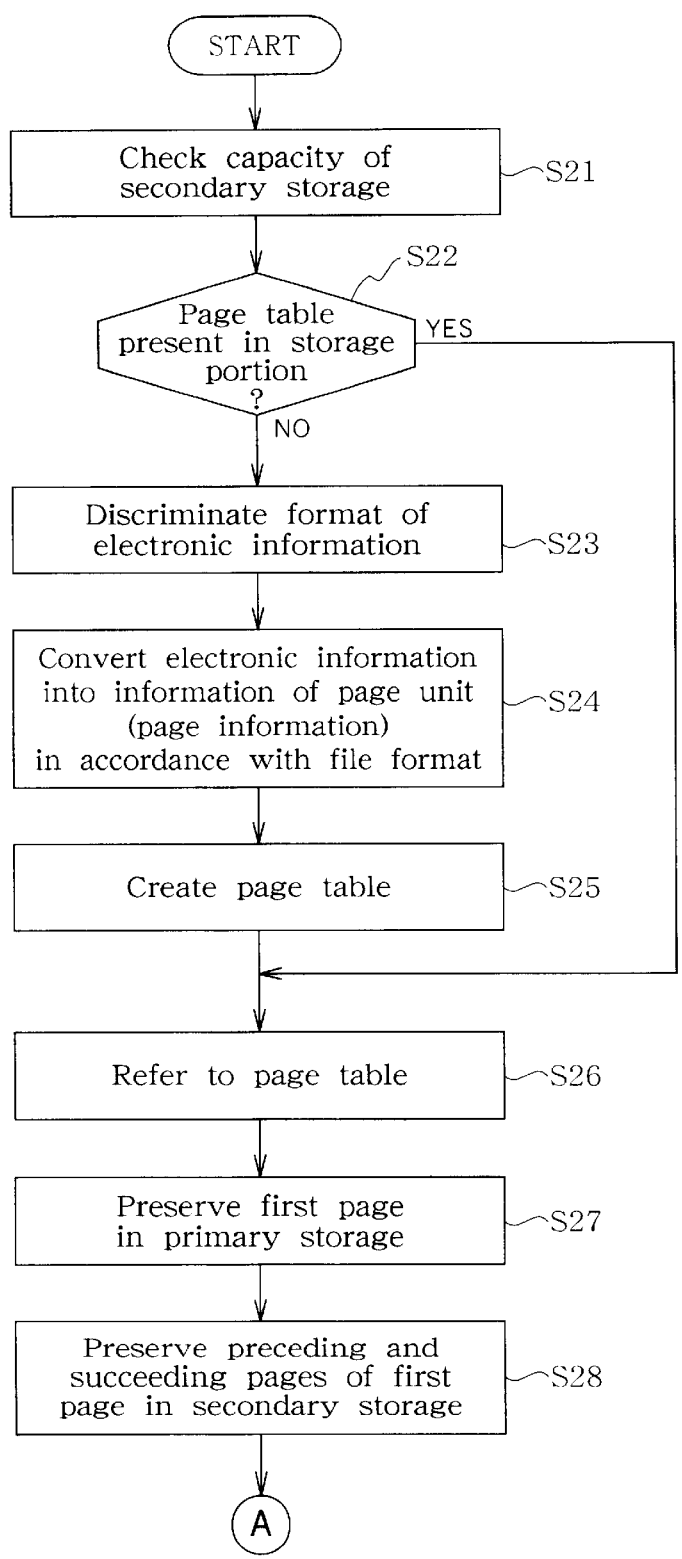
FIG. 17 is a flowchart showing the former part of a page information display process in the configuration as shown in FIG. 16.

FIG. 17 is a flowchart showing the outline of the operation in this example. Firstly, to check the cache capacity, the page information manager 43 confirms the capacity of the secondary storage 47 (step S21). Subsequently, the page information manager 43 confirms the presence or absence of the electronic information 1A and the page table 41 (step S22). The page information manager 43 manages the page converter to convert the electronic information 1A into the page information 1B, when the electronic information 1A exists in the storage portion 4 and the page table 41 does not exist in the storage 4. In this case, the page converter 42 firstly checks the file format of the electronic information 1A (step S23). The amount of information which can be displayed in the information viewing area 5 is automatically created into the page information in a unit of page (step S24). This conversion process will be described later in detail as the related art. Then, the page information manager 43 determines the tag content 18 such as page number for the page information in the order of creating the page information, and registers the electronic information 1A as the page information in the page table 41 (step S25).

At step S24, the electronic information 1A in different file formats is made viewable as one book having a linear information structure. The page table 41 can be rewritten and changed without departing from the linear information structure viewable in this example.

In this example, the viewing information to be displayed on the display 1 is stored in the primary storage 46 which has the highest speed. Also, the secondary storage 47 having a higher speed in reading and writing the information than the storage portion 4 has stored the viewing information for the user to view at the next time. Therefore, if the page to be displayed by the viewing operation is determined, the page table 41 is referred to (step S26). A page to be displayed is stored in the primary storage 46 (step S27). The previous and next pages are stored in the secondary storage 47 (step S28). This is to enable the high-speed display by transferring the page information from the secondary storage 47 to the primary storage 46, when the page information requested by the display manager 44 is in the secondary storage 47. If the page information requested by the display manager 44 is not present in the secondary storage 47, the page information is taken from the viewing information in the storage portion 44 and stored in the primary storage 46.

Figure 18:
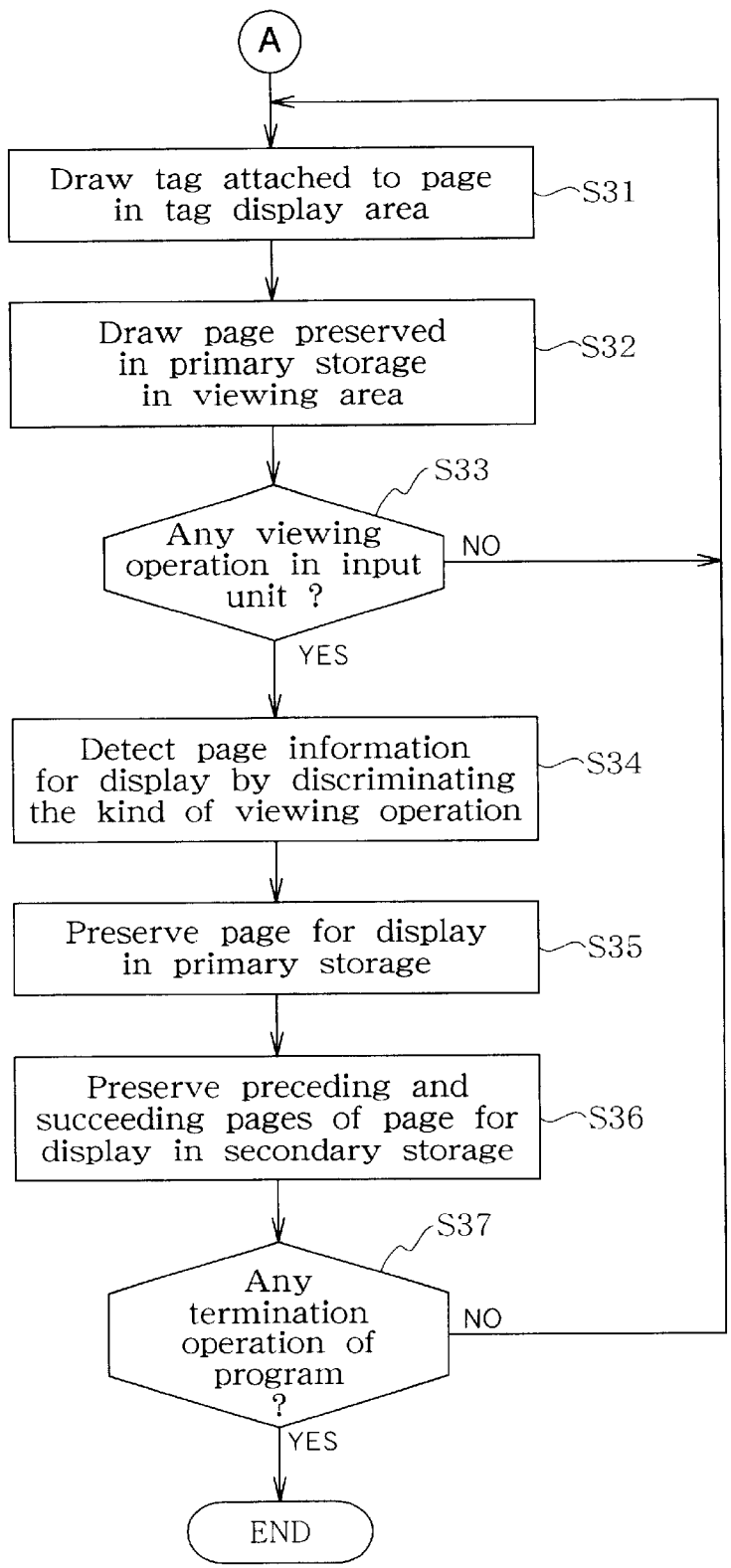
FIG. 18 is a flowchart showing the latter part of the page information display process continued from the process of FIG. 17.

As shown in FIG. 18, the tag 8, 9, 10 appendant to the page is drawn in the tag display area (step S31). And the page information stored in the primary storage 46 is displayed in the information viewing area 5. Subsequently, the procedure waits for an input into the input unit 3 such as a touch panel (step S33).

If a viewing operation such as rolling the page is applied to the input unit 3, the viewing operation manager 45 judges the content of operation to pass the sort of viewing to the display manager 44 (step S34). The sorts of viewing may include, for example, rolling the page one after another, switching promptly from the viewed page to another page, rolling the pages in a certain range roughly, and displaying only the desired article contained in the electronic information over the entire viewing area in full.

If the sort of viewing is passed to the display manager 44, the page information to be displayed in the information viewing area 5 is determined from the sort of viewing. For example, when there is a request to the page information manager 43 of storing the viewing information to be displayed in the primary storage 46, another page information for the user to view newly at the next time is retrieved from the storage portion 4 and stored in the secondary storage 47, if the viewing information stored in the primary storage 46 can be passed from the secondary storage 47 (step S35).

The secondary storage 47 should store more succeeding pages of the currently displayed page, thereby resulting in higher hit rate because viewing is typically made in an ascending direction of page number. When there is a pointer event such as expanding the tag, as will be described later, the page subjected to tag expansion may be read beforehand, and stored in the secondary storage 47.

First Example

Adjusting the Tag Length at the Start Time of Viewing

In this example, a method of determining the tag length at the start time of viewing is disclosed. The electronic information 1A or electronic information 1B has the total page number which is variable depending on its contents. In the example as shown in FIGS. 3 and 4, the length in the tag display direction divided by the total page number is equal to a tag length. However, as the total page number increases, the tag length is too short to effect a simple uniform allocation. In this first example, solving means for effecting the tag display when the total page number is large is shown.

Figure 20:
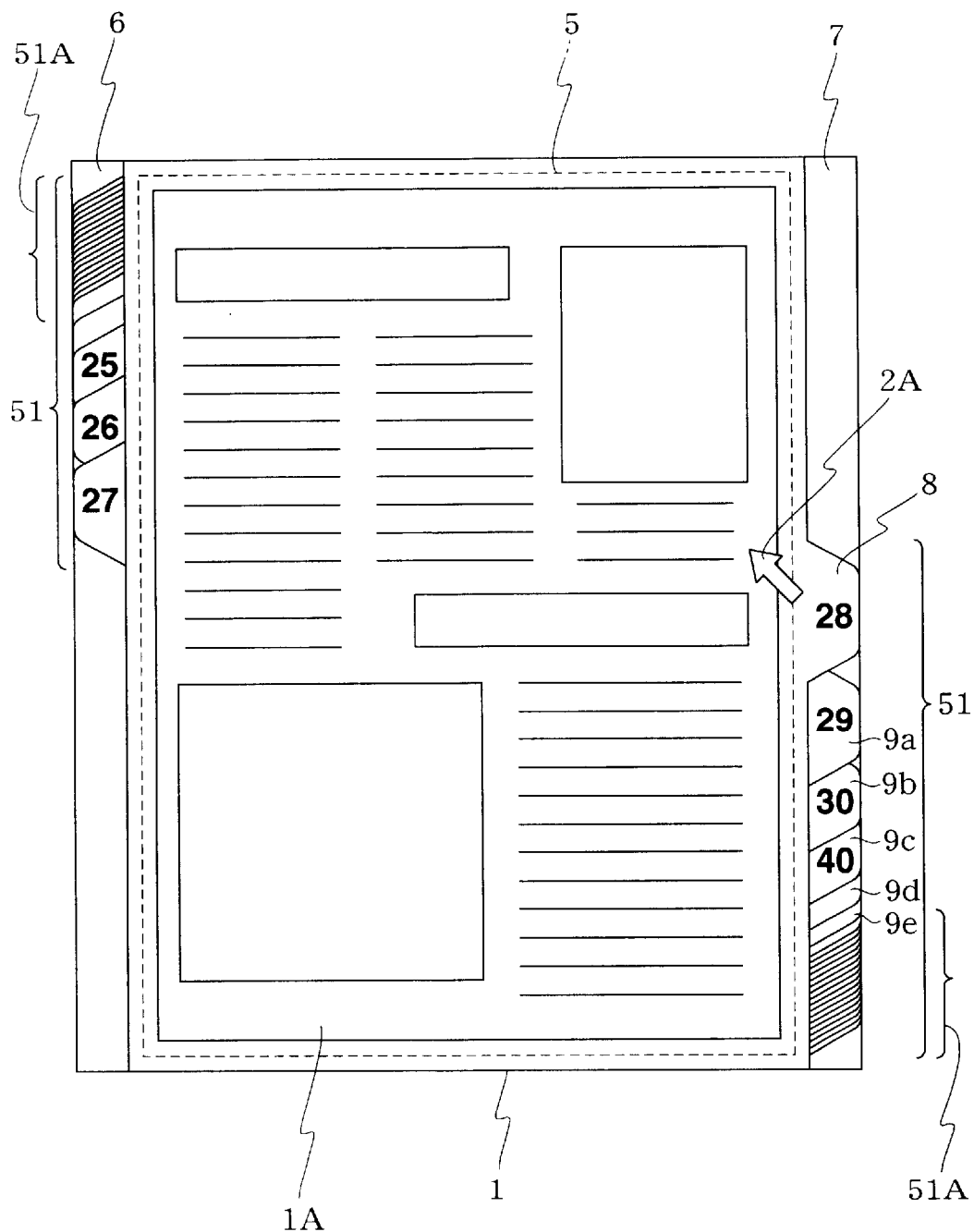
FIG. 20 is an explanatory view illustrating a semantic display in the configuration as shown in FIG. 19.

When there are so many number of pages that it is difficult to draw the tags in the operation area with sufficient tag interval, the tag is drawn by gradually narrowing the interval between adjacent tags up to a certain page at the height proportional to the absolute value of a difference in the page number between the tag associated with the viewing area and other tags as shown in FIG. 20 (semantic display). The tags beyond the certain page range are superposed and drawn densely with a fixed tag interval.

Since in the semantic display the tag length is shorter successively for every tag, the tags for the current page and its neighboring pages can excellently have the tag content such as page number, and the position of the current page relative to the total page number is clear. Further, an interface which enables the user to detect the total page number at a glance can be constructed.

Figure 19:
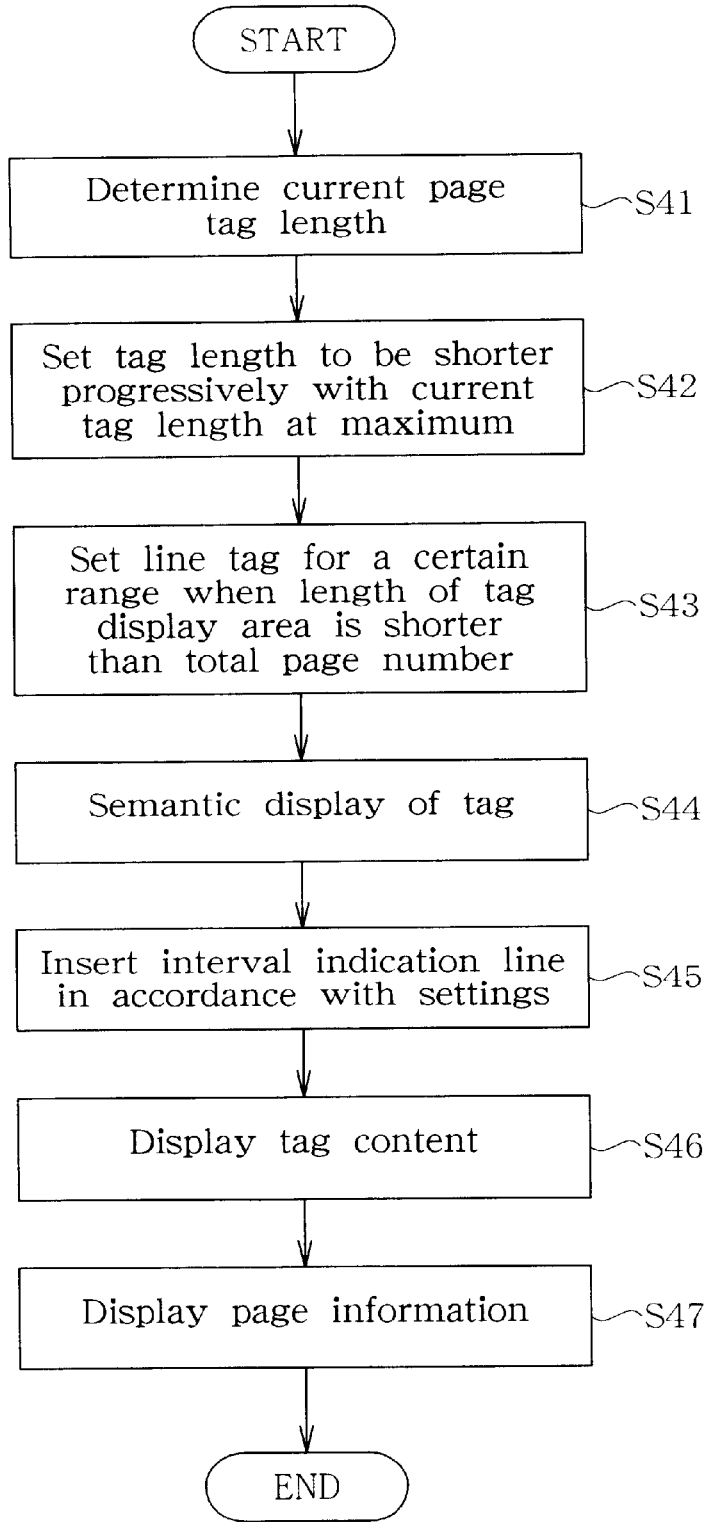
FIG. 19 is a flowchart showing the configuration of a semantic display process in which the tag length is changed consecutively in a first example of the present invention.

Referring to FIG. 19, a page display method of this example will be described below. First, the length of a current page tag 8 appendant to the current page is determined by referring to the tag length as the reference (step S41, a step of calculating the tag length). Subsequently, the length of each tag is set to be shorter at lower hierarchical level, with the tag length of the current page tag 8 as the maximum value (step S41, a step of creating the semantic display). And when the length of tag display area is too insufficient for the total page number, a line tag display 51A is set for a certain range (step S43, a step of setting the line tag) And the tags are displayed semantically (step S44). Depending on the content of page information, an interval display line for changing the thickness of tag contour line may be inserted at every page intervals (a step of inserting the interval display line). And the tag content such as page number is displayed for the tag capable of indicating the tag content in accordance with the tag length and the font size for display (step S46). Further, the page information of current page is displayed in the information viewing area.

Referring to FIG. 20, the current page is the 28th page. With the tag length of this current page tag 8 as the maximum value, the tag length is shorter in the order of tags 9a, 9b, . . . , 9e. In this example, the tag length is 0.8 times the previous one for each tag from the current page to effect the semantic display. And among the tag shapes indicated by reference sign 51A, the line tags which have only lower lines displayed are also implemented by this multiplier of 0.8. If the resolution of the display can not follow the line interval of tag, the tags are consecutively displayed by the line. In the example of FIG. 20, the previous and next tag lengths are 0.8 times the current tag length, with the tag length of the current page tag 8 in the other tag display area 7 as the reference. As a result, the tag length which is displayed at the uppermost level (tag for 27th page) in the one tag display area is equal to the tag length indicating the 29th page. In this way, by making the tag length of the previous page shorter than the tag length of the current page, the current page tag is highlighted, with more deepness.

The semantic display as shown in FIG. 20 may be made at any time, irrespective of the total page number of page information. But in the case where the total page number is small, the semantic display may impede the effective use of the tag display area. Therefore, it is desirable to switch between the normal display as shown in FIGS. 3 and 4 and the semantic display as shown in FIG. 20 in accordance with the total page number of page information. This switching of display mode can be made based on the minimum reference length of the current page tag. That is, when all the tags are allocated over the entire length of the tag display area in the tag display direction, as shown in FIG. 3, the semantic display may be effected, as far as the tag length per tag is below the reference length.

FIG. 21 is a table showing a data structure of the page information display data required to switch between these display modes. The minimum reference length is simply determined by the number of dots, as shown in FIG. 21A, when the physical length and resolution of the display are predetermined. On the other hand, to provide a data structure not dependent on the actual display, the physical length and the number of dots for display may be accepted at the time of execution, and the minimum reference length may be determined by the physical length in meter. In this way, the user can use uniformly various apparatuses in respect of different page rolling operations or different displays of deepness using the tag. When the semantic display is made, the sense of deepness can be represented, even if the tag display area is not necessarily provided on the left and right sides. However, from the aspect of recognizing the current page position promptly, the tag display area is desirably provided on the left and right sides.

In the example of FIG. 21A, the page information display data includes the display dot number data of the display portion in each of the page rolling direction and the tag display direction, the total page number data of electronic information stored in the storage portion, the dot number data per unit tag which is equal to the number of dots in the dot number data divided by the total page number in the total page number data, and the minimum reference data having the minimum reference width of tag which is predetermined for the tag length in the page rolling direction and the minimum reference length of tag which is predetermined for the tag length in the tag display area, which are in comparison with the number of dots per unit tag. In the example of FIG. 21A, the length of unit tag is selected to a larger value between 80 dots which is the minimum reference length and the value of 1600 dots divided by the total page number ap. Using this data, the page information manager 43 as shown in FIG. 16 can determine the tag length of current page tag, and switch between the normal display and the semantic display.

In the example of FIG. 21B, the minimum reference length is selected to a larger value between 2 cm and the value of the tag display area length divided by the total number page ap. The page information manager 43 can obtain the physical length per dot from the relation between the display dot number data and the tag display area length, and thereby the number of dots per unit tag length.

The page information display data may have the tag ratio data which is referred to when the dot number data per unit tag is shorter than the minimum reference data. This tag ratio data is a ratio of the tag length varied successively from the current page of electronic information to the end page or start page relative to the tag length of the minimum reference data. And the tag length is calculated successively from higher to lower hierarchy by referring to this tag ratio data. Then, the tag is overwritten in the tag display area from lower to higher hierarchy. In this way, the tags can be overlapped well. When the total page number is large, the line tag is produced in accordance with the resolution. Consequently, a consistent interface can be constructed.

Figure 22:
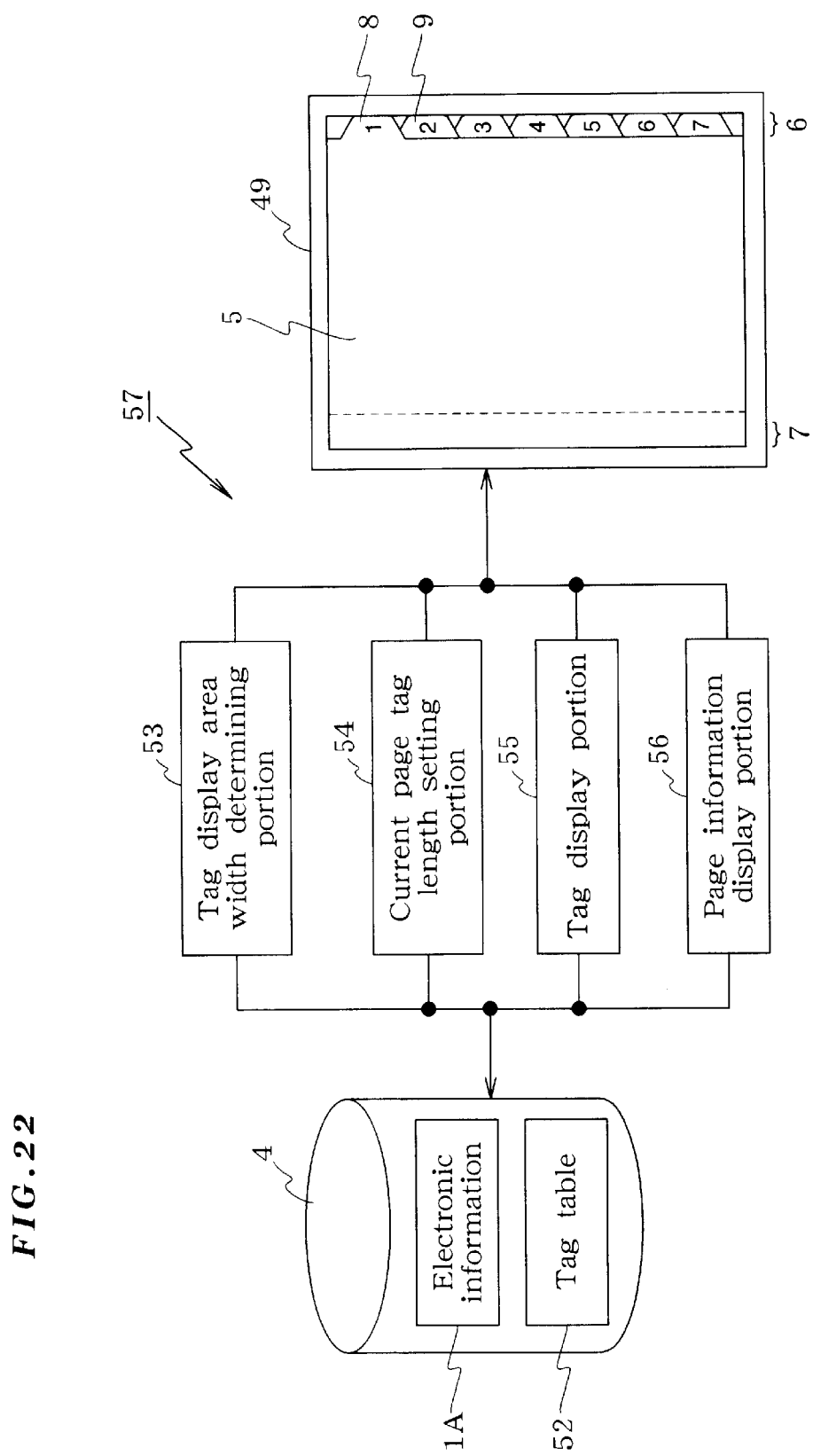
FIG. 22 is a block diagram illustrating the configuration of a page data display portion in the first example.

FIG. 22 is a functional block diagram showing the configuration for designating the tag shape using the page information display data as shown in FIG. 21. In an example of FIG. 22, there are provided a storage portion 4 for storing electronic information having a plurality of pages in a unit of page of predetermined size, a display 49 having an information viewing area 5 for displaying electronic information stored in the storage portion 4 in a unit of the page, and a page information display portion 56 for enabling electronic information stored in the storage portion 4 to be read on the basis of the page specifying information externally input, and displayed in the information viewing area.

The display 49 has a tag display area 6 provided along with the information viewing area on one end or both ends in the page rolling direction to roll the page of page information in the information viewing area 5. Further, it comprises a tag shape calculating portion for calculating the length of tag appendant to each page in the tag display direction on the basis of the length of tag display area in the tag display direction which is orthogonal to the page rolling direction, and the total page number ap of electronic information stored in the storage portion 4, and a tag display portion 55 for displaying the tag in the tag display area on the basis of the length of tag which is calculated by this tag shape calculating portion.

The tag shape calculating portion comprises a tag display area width determining portion 53 for determining the width of the tag display area, on the basis of the minimum reference width of tag and the size of electronic information in the page rolling direction, for example. For example, if the residual length of the page rolling area when the longitudinal length of page information is enlarged or reduced to the longitudinal length of the display is below the minimum reference width, the enlargement or reduction ratio of page information may be changed. Also, the tag shape calculating portion comprises a current page tag length setting portion 54 for setting the tag length of current page to the tag length per unit tag which is the length of the display 49 in the tag display direction, divided by the total page number ap of electronic information, and setting the length of current page tag appendant to the page being currently displayed to the minimum reference length, when the tag length is shorter than the minimum reference length of tag. When the tag length of current page is set to the minimum reference length, the semantic display is made in this example. Or otherwise, the normal display is made.

To display the tags on the basis of the minimum reference length, a tag table (or a page information display data) containing the minimum reference width of tag in the page rolling direction and the minimum reference length of tag in the tag display direction which are predetermined on the basis of the size of the display 4 is stored in the storage portion 4. The tag display portion 55 may display the tag having a width determined by the tag display area width determining portion 53 and a length determined by the current page tag length setting portion 54 in the tag display area.

With the configuration as shown in FIG. 22 or FIG. 16, the operation of each portion can be realized by the CPU and the program, in the same way as shown in FIG. 2. For example, a program for calculating the tag length, using the page display information of the data structure as shown in FIG. 21, has a tag length calculation command for calculating the length of each tag appendant to each page in the tag display direction on the basis of the length of tag display area in the tag display direction and the total page number ap of electronic information stored in the storage portion 4, and a tag display command for displaying the tab in the tag display area on the basis of the length of each tag calculated in accordance with the tag length calculation command. The tag length calculation command contains a subcommand for effecting translation between the physical length and the number of dots, if the minimum reference length of FIG. 21B is the physical length.

Figure 23:
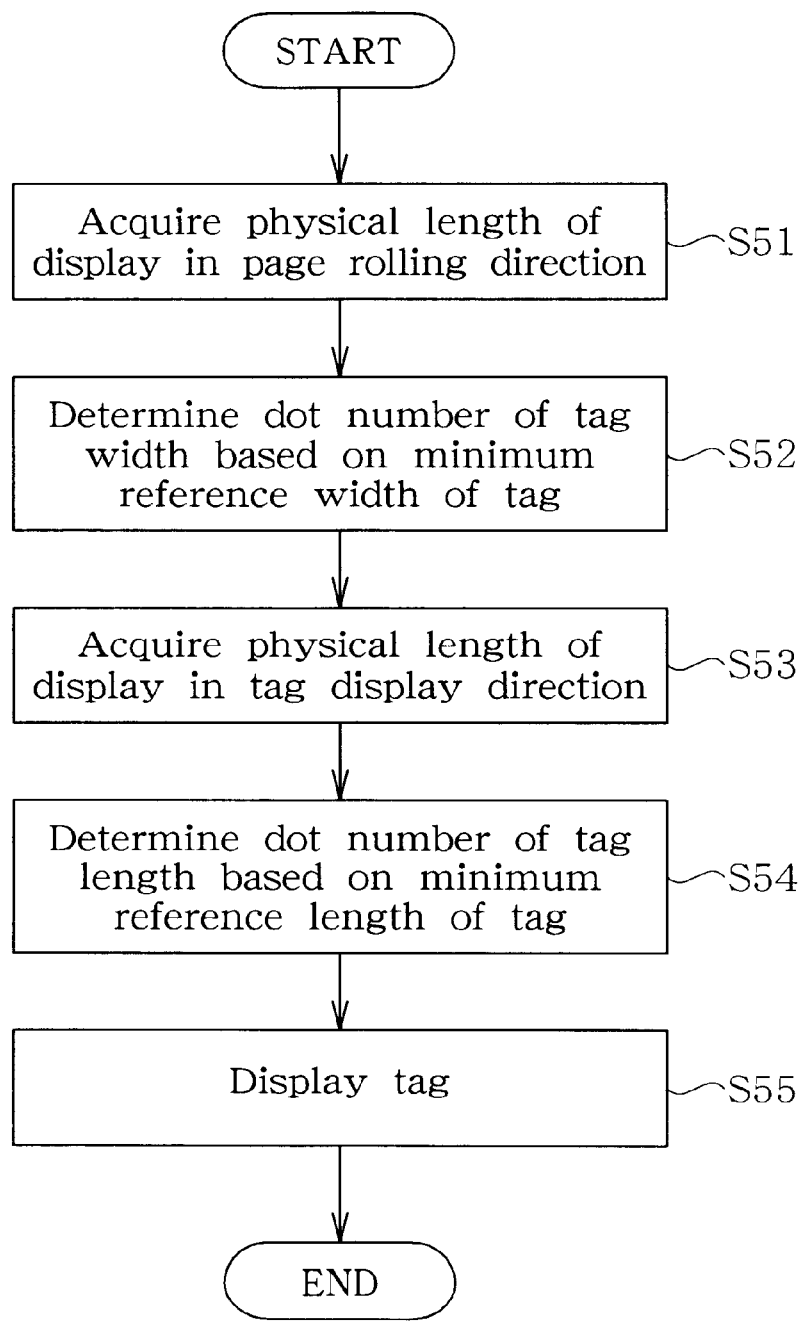
FIG. 23 is a flowchart illustrating a process for determining the tag width and the tag length using the data of data structure as shown in FIG. 21.

FIG. 23 is s flowchart showing a process of determining the tag width and the tag length using the data of the data structure as shown in FIG. 21B. Firstly, the physical length information of the display 49 in the page rolling direction is acquired (step S51, a step of acquiring the physical length). Subsequently, the minimum reference width of tag at the resolution of the display is calculated on the basis of the physical length information acquired at step S51 of acquiring the physical length and the minimum reference width of tag in the page rolling direction which is predetermined by the physical length (minimum tag width calculation step) And the width of the tag display area is determined on the basis of the minimum reference width dependent on the display 49 calculated at step S52 of calculating the minimum tag width and the size of electronic information (step S52 of determining the tag display area width).

Subsequently, the physical length information of the display in the tag display direction which is orthogonal to the page rolling direction is acquired (step S53, a step of acquiring the physical length). Then, the minimum reference width of tag at the resolution of the display is calculated on the basis of the physical length information acquired at step S53 of acquiring the physical length and the minimum reference width of tag in the tag display direction which is predetermined by the physical length (minimum tag length calculation step). When the tag length per unit tag which is equal to the length of the display in the tag display direction divided by the total page number of electronic information is shorter than the minimum reference length, the length of current page tag appendant to the page being currently displayed is set to the minimum reference length (step S54, a step of setting the current page tag length).

And the tag having a width determined at step S52 of determining the tag display area width and a length determined at step S54 of setting the currentpage tag length is displayed in the tag display area (step S55, tag display step). Thereby, the tag having an excellent shape can be displayed without being dependent on the resolution.

Figure 24:
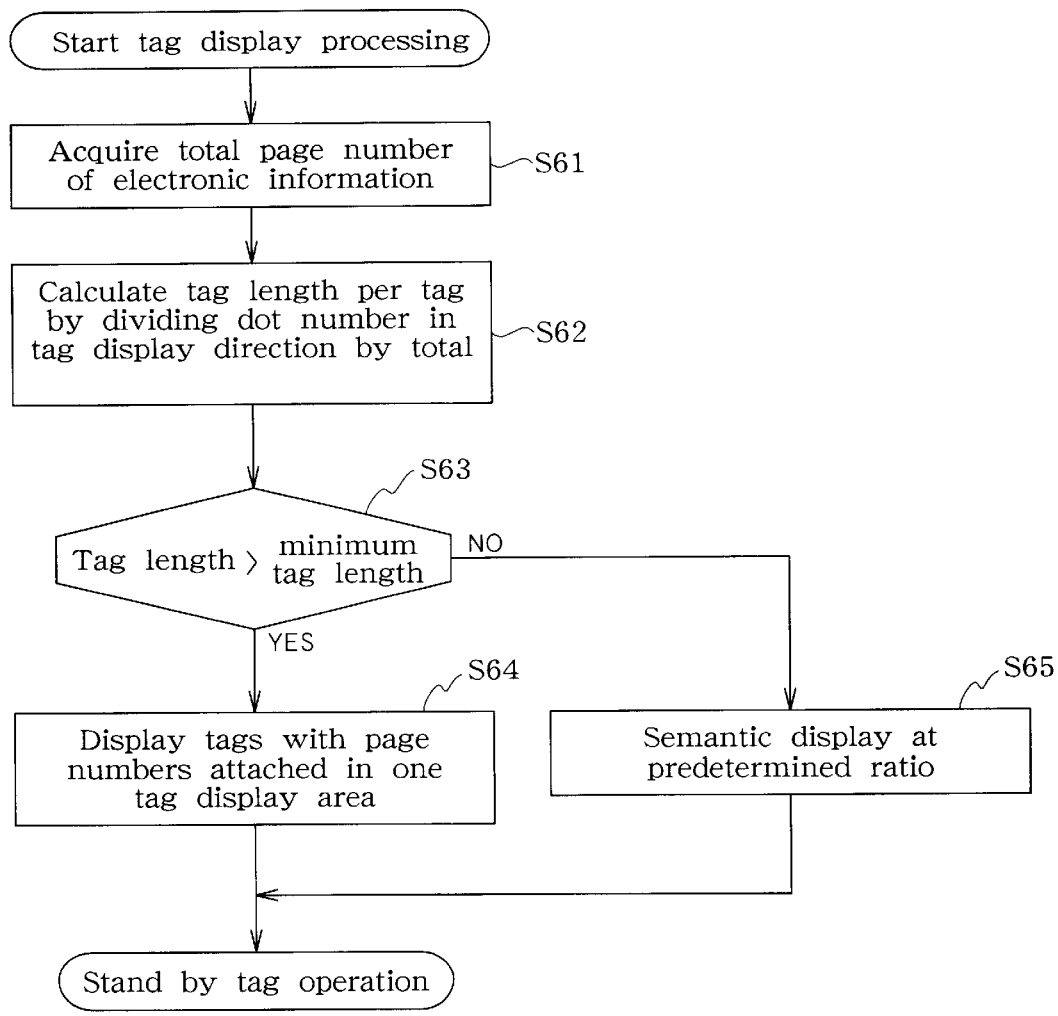
FIG. 24 is a flowchart illustrating a process for switching between the normal display and the semantic display in the configuration as shown in FIG. 16.

FIG. 24 is a flowchart showing a process of switching between the normal display and the semantic display. As shown in FIG. 24, the total page number of electronic information is acquired in starting the display of page information (step S61). And the tag length per tag is calculated by dividing the number of dots in the tag display direction by the total page number (step S62). Then, a comparison is made between the calculated tag length and the minimum reference tag length as shown in FIG. 21. If the calculated tag length is longer, the normal display is effected (step S64). On the other hand, if the calculated tag length is shorter than the minimum tag length, the semantic display with a multiplier of 0.8 is effected (step S65).

The page information display device for enabling the selection of the display mode may comprise, in addition to the configuration of FIG. 22, a tag display mode selecting portion for selecting the normal display in which the length of tag to be displayed in the tag display area is a fixed length, when the total page number of electronic information is a predetermined number or less, or selecting the semantic display in which the tag length is reduced stepwise from the current page tag, when the total page number exceeds the predetermined number.

Second Example

Adjusting the Tag Length After Rolling the Page

A second example of the present invention will be described below. In the second example, the tag is redisplayed, after some operation is applied to the page information and tag on the display in the first example, and a different page is displayed. As to how to display the tag after rolling the page, adjusting the tag height is required. In the example of FIGS. 3 and 4, the normal display is effected. The current page tag is moved from the other tag display area 6 to the one tag display area 7 while maintaining the tag height constant. In the semantic display as shown in FIG. 20, the tag can not be continuously moved with the constant tag height maintained. In the present example, the measures for this point are disclosed.

Figure 25:
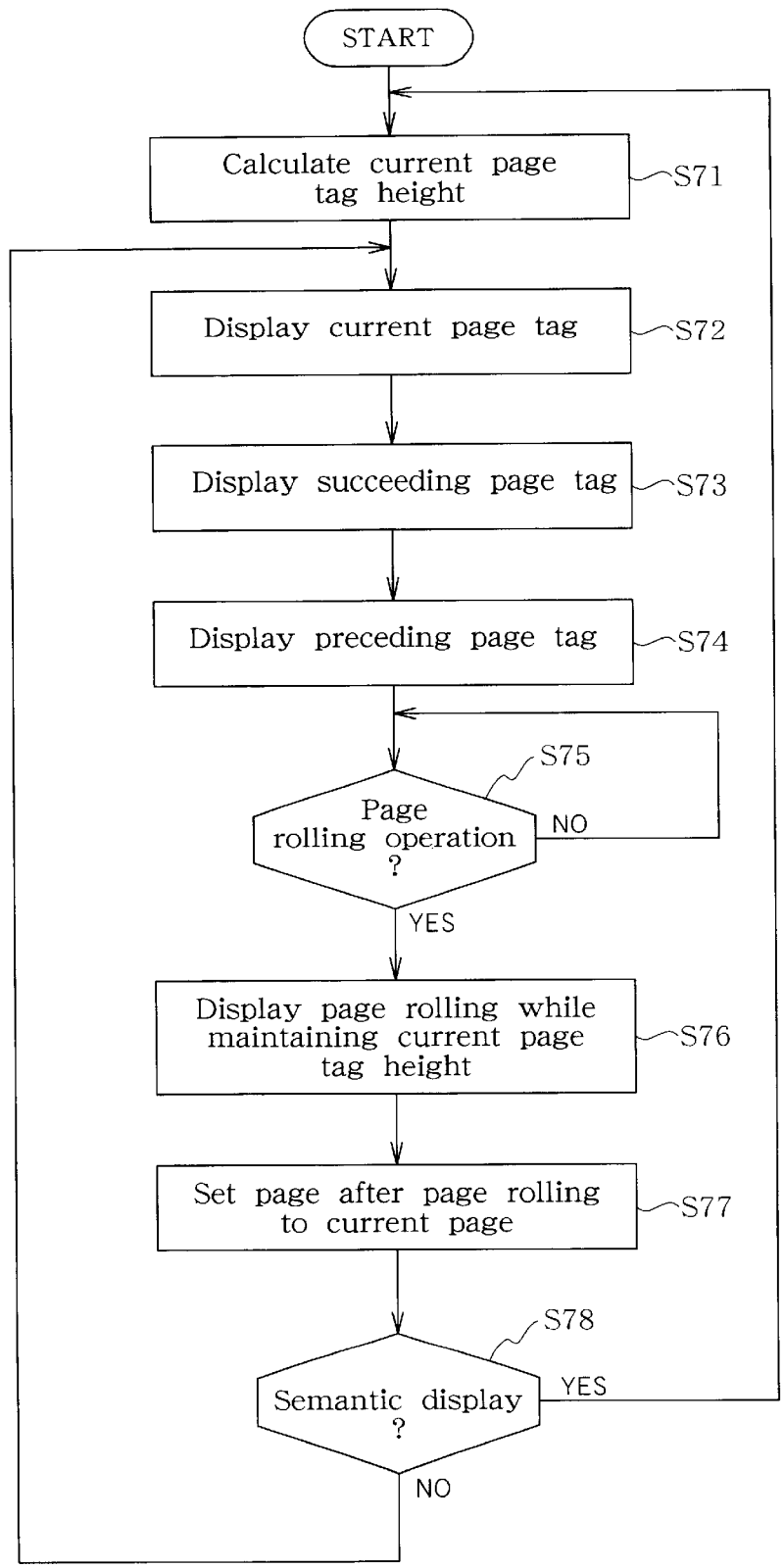
FIG. 25 is a flowchart illustrating a process for displaying the tag again after rolling the page in a second example.

FIG. 25 is a flowchart showing a process for redisplaying the tag after rolling the page in the second example. In an example of FIG. 25, firstly, the tag height of current page is calculated (step S71). This step S71 of calculating the current page tag height calculates the height of current page tag appendant to the current page number of current display object, on the basis of the ratio of the current page to the total page number of electronic information. Then, in the normal display, the height of tag once displayed is not changed. On the other hand, in the semantic display, the height of current page tag is changed in accordance with the page number of current page to be displayed.

Subsequently, the current page read from the storage portion 4 is displayed in the information viewing area. The tag appendant to the current page is displayed in the one or other tag display area 6, 7 at a current page tag height calculated at step S71 of calculating the current page tag height (step S72 of displaying the current page tag). Before or after this step S72 of displaying the current page, the tag 9 appendant to each page succeeding the current page is displayed in the one tag display area 9 at a smaller height than the current page tag height (step S73 of displaying the succeeding page tag). On the other hand, the tag appendant to each page preceding the page number of current page is displayed in the other tag display area 10 at a larger height than the height of current page tag (step S74 of displaying the preceding page tag).

Figure 26:
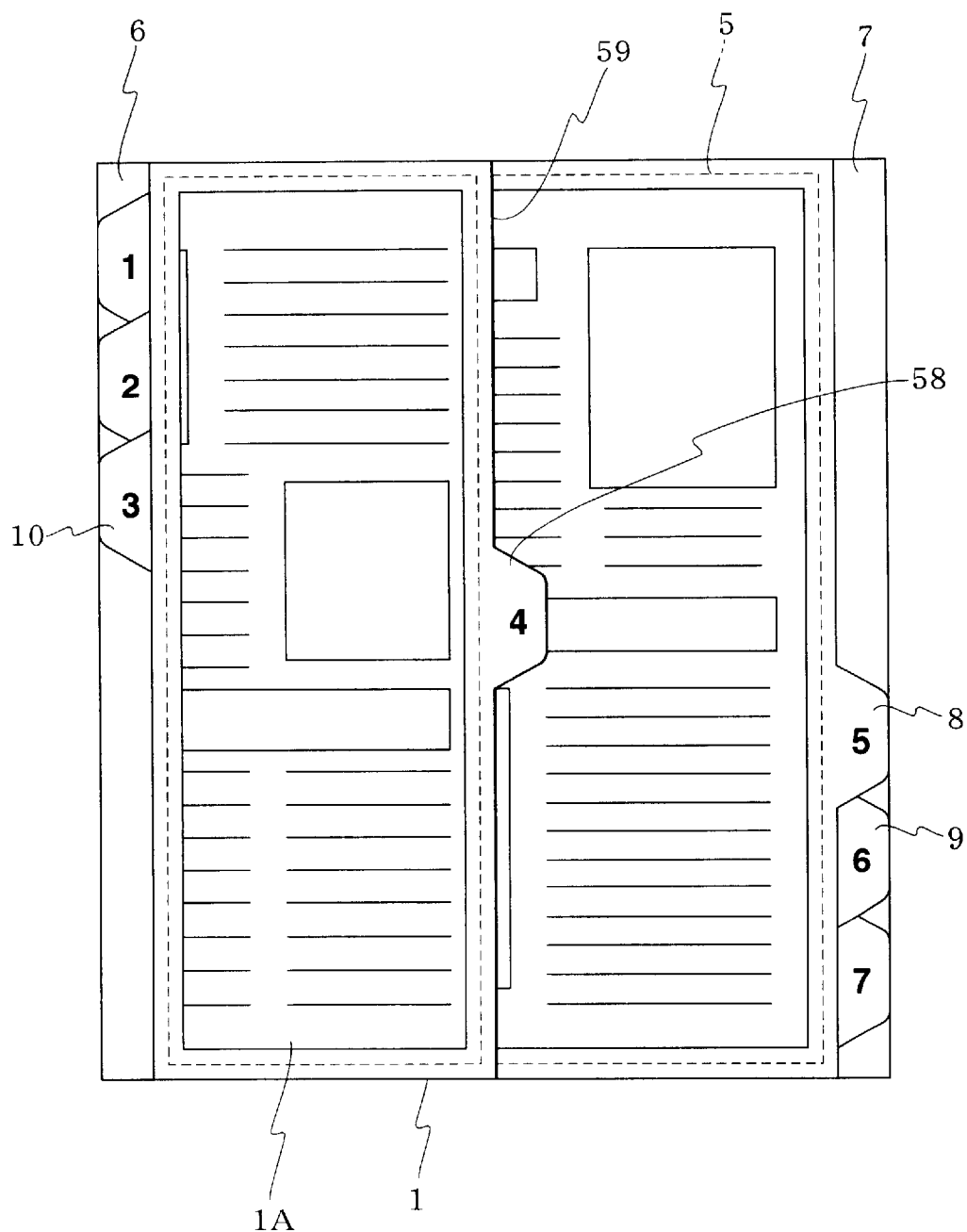
FIG. 26 is an explanatory view illustrating the display during the page rolling in the second example.

Subsequently, the procedure waits for an operation of rolling the page (step S75). Further, when there is the operation of rolling the page, the page rolling is displayed like animation with the tag appended to the page being rolled, while maintaining the tag height of current page tag, as shown in FIG. 26 (step S76). Then, the page after being rolled is set as the current page (step S77).

In this example, a process after resetting the current page is different between the normal display and the semantic display. That is, in the semantic display (step S78), the tag height of current page is recalculated on the basis of the ratio of the current page to the total page number (step S71 of redisplaying the same ratio tag). On the other hand, in the normal display, the current page tag is displayed while maintaining the height of each tag (step S72 of redisplaying the same height tag). Thereafter, this process is repeated.

A page display program for implementing this process may have, for example, a tag length calculation command, a normal display command, a semantic display command, and a tag height control command. Specifically, the tab length calculation command calculates the tag length per tag on the basis of the total page number information of electronic information and the length of the tag display area. The normal display command sets the calculated tag length to a display tag length when the calculated tag length is above a predetermined tag length. The semantic display command sets the predetermined tag length to the tag length of current page when the calculated tag length is below the predetermined tag length and sets the length of tag appended to each page preceding and succeeding the current page to a shorter length stepwise, with the tag length of current page at the uppermost level. The tag height control command redisplays the tag at the constant height of each tag during the normal display or by calculating the tag height on the basis of the page number of a new current page during the semantic display when there is an operation of rolling the current page displayed in the information viewing area. The semantic display command may be initiated when the normal display command can not be executed. Since the tag height control command requires the information of whether the normal display or the semantic display is made, a flag indicating the current display mode may be stored in the page table 41.

Referring to FIG. 26, the current page is rolled when the fourth page is displayed. Then, the fifth page is displayed. Then, to provide the user with an impression like rolling the book, the display area of the page being rolled is reduced gradually and the display area of a new page to be displayed is increased gradually in the example of FIG. 26. This display example involves various patterns, which may be selected in accordance with the display processing ability of the controller for use. For example, if the controller can perform a high speed 3D processing (with the CPU and operating system), the state of rolling the paper may be displayed in the three dimensions. Also, the page may be revolved around the tag display area 6 in the tag display direction while the data being displayed is deformed in accordance with the rolling movement.

In an example of FIG. 26, the motion of rolled page is followed by the motion of tag, as indicated by reference numeral 58. That is, the page information display method of this example includes a page rolling step of moving the current page in the page rolling direction, and displaying a page to be displayed by a tag operation in the information viewing area, when the tag operation is applied to a tag displayed in the tag display area, and a tag moving step of moving the tag appended to the current page between the one and other tag display areas in the page rolling direction along with the movement of the current page, when the current page is moved at the page rolling step. Thereby the position of page being moved becomes clear. Also, in the example of displaying the page rolling in the three dimensions, the tag shape may be deformed and moved while following the page. For example, if the tag width is made gradually slender, the behavior of the page moving upward with the rotation can be represented.

Figure 27:
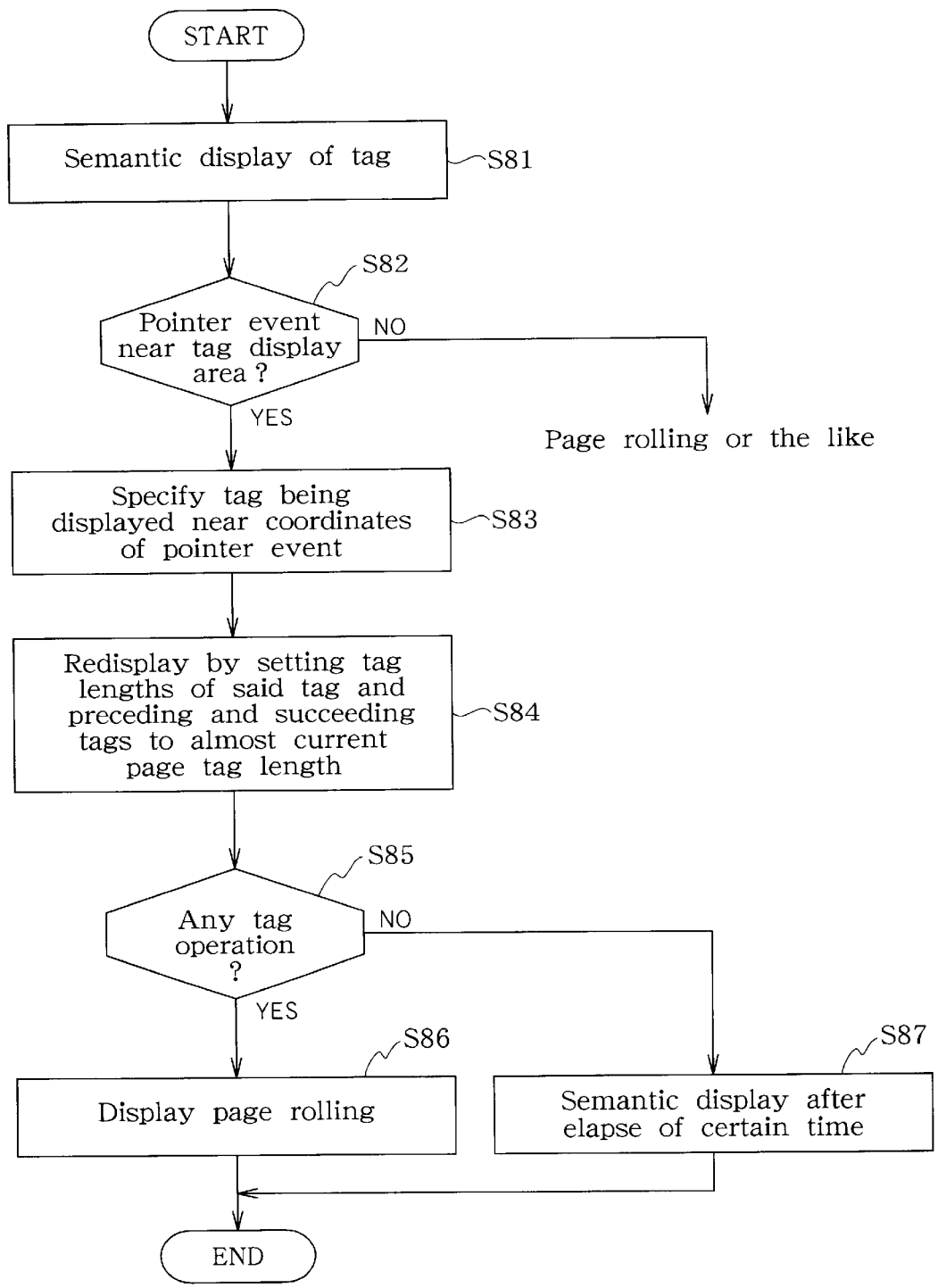
FIG. 27 is a flowchart illustrating a process for expanding the tag during the semantic display.

FIG. 27 is a flowchart showing a process of expanding the tag during the semantic display. First of all, the tag is on the semantic display (step S81). And if there is a pointer event near the tag display area, a tag being displayed is designated near the coordinate at which the pointer event occurs, for example, when a pointer 2A comes closer to the tag display area which is selectively displayed. In an example of FIG. 28, the pointer indicated by reference sign 2A comes closer to a line tag indicating the 48th page among the line tags displayed and designates it. In this case, the lengths of the tag indicating the 48th page and its preceding or succeeding three or five tags are reset to substantially as long as the tag length of current page and displayed (step S84 of expanding the tag) Then, the page information of the 48th page may be stored in the secondary storage 47 as shown in FIG. 16.

If there is no tag operation (step S85), the tag display is restored after the elapse of a certain time (step S87). On the other hand, if there is any operation on the expanded tag displayed, the processing such as rolling the page is performed (step S86). A program for executing the processing as shown in FIG. 27 may have a tag expanding command for expanding the tag length displayed on the basis of the relation between the tag displayed in the tag display area and the coordinates or pressure of the pointer, and a tag length return command for returning the tag length expanded to its original length after the elapse of a certain time.

Figure 28:
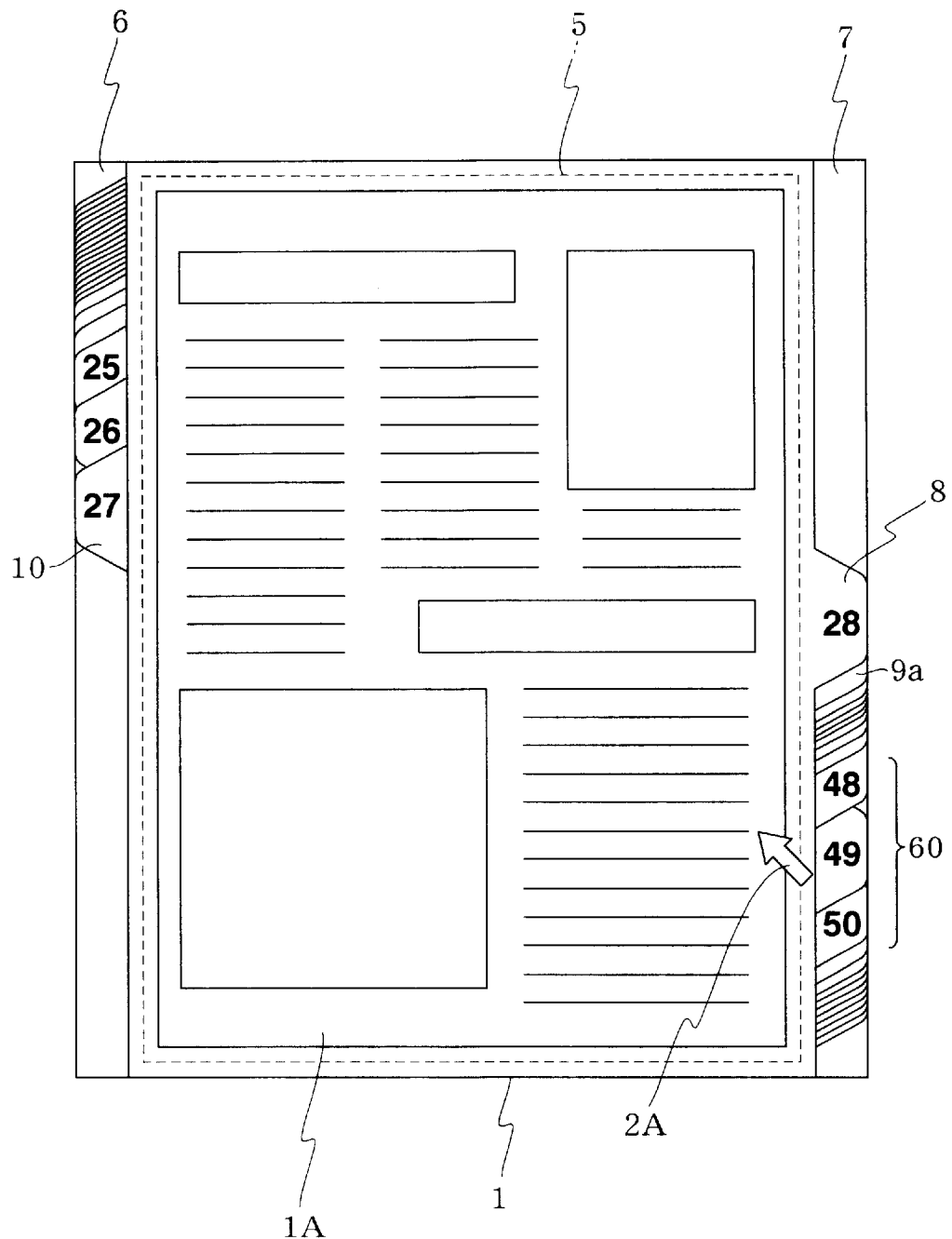
FIG. 28 is an explanatory view illustrating the display with the tags near the pointer expanded in the process for expanding the tag as shown in FIG. 27.

Referring to FIG. 28, the tag expanding process will be described again. A tag which is closest to the pointer 2A (tag of the 49th page in FIG. 28) when the distance h between the tag and the input cursor is below a certain distance H1, is drawn at a height inversely proportional to the distance h with a gradually wider interval between tags as the coordinates of an input cursor comes closer to the tag (tag of the 49th page). When the distance between the fingertip coordinates and the tag (tag of the 49th page) is greater than a predetermined distance H2, the change of the interval between tags as shown in FIG. 28 gradually returns to a display state of FIG. 20, after the elapse of a fixed time from exceeding it.

Third Example

Page-rolling Operation with Tag

The tag display as shown in FIG. 3 or 20 is through an interface which is not only superior in the respect of allowing the user to intuitively know the total page number or the position of current page relative to the total page number of electronic information, but also favorable as a tool to allow the user to display a desired page from among a plurality of pages defined linearly. In this example, there is provided an interface in which an operation of rolling the page for a book is a metaphor, and using a tag which is considered to be an artificial presence, the operation can be intuitively understood, irrespective of the computer experiences.

In this example, a pointer driven interface is adopted. The pointer may be a fingertip or a pen-type pointer, for the use of a touch panel display 49, or a mouse 105, an arrow key or the like operated by the arrow key of the key board 104 and displayed on the screen, for the use of a CRT connected to a computer 100. To prompt the user for intuitive understanding, the touch panel is desirable.

There are roughly four ways of rolling the page for a book, including rolling one page after another to read, rolling the pages relatively quickly while searching for a key word, opening a predetermined page by referring to the page number, and rolling plural pages at once forcefully. When rolling the pages relatively quickly, the pages may be rolled by the use of elasticity of paper, with the end portion of pages pressed, without displaying the entire page. To make these operations metaphoric, various pointer events to the tag are used.

One viewing means of switching promptly from one page being viewed to another page to view is a click of tag. The sheets may be brushed at the side edge in rolling the page for the book. The similar operation is conducted by the click of tag. The user directly touches the tag 8, 9, 10 of the page which the user wants to view, so that the page information corresponding to the tag content 18 such as page number of the designated tag 8, 9, 10 is displayed in the information viewing area 5, as desired, while the behavior of rolling the page is displayed visually. In a case where there occurs a pointer down within the tag, and a pointer up within the same tag, the page with the tag appended may be rolled.

One viewing means of rolling the pages sporadically in a certain range roughly involves touching the tag with a fingertip and keeping the fingertip away from the tag consecutively, while tracing with the fingertip plural tags appendant to the page information desired to read by rolling the pages, so that each page information is displayed in the order of touching the tag in the information viewing area 5, with a constant display interval and consecutively. Then, the timer 48 measures the time until plural tags have been touched. At a display rate proportional to the measuring time, the page information can be displayed in succession. In practice, when rolling the pages sporadically, the sheets to be rolled are turned over, with the side edge of the sheets. In the same way, the tags are consecutively pointed down, to effect the rolling of the pages in succession.

Figure 29:
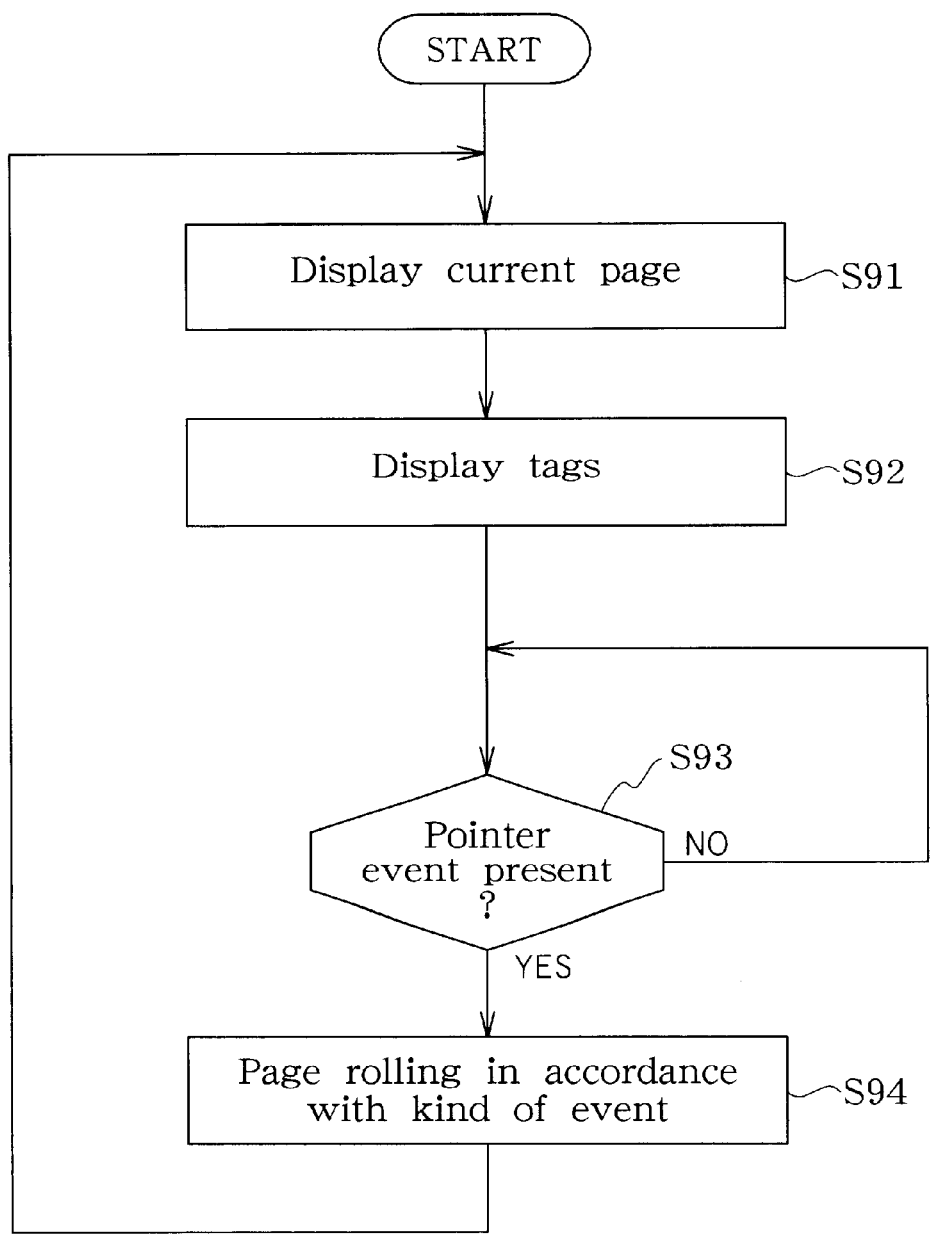
FIG. 29 is a flowchart illustrating a process of a third example of the present invention.

Referring to FIGS. 29 and 30, a pointer driven interface will be described below in detail. FIG. 29 is a flowchart showing a process in the third example of the present invention. First, a current page is displayed (step S91). Each tag is also displayed in the normal display mode or the semantic display mode (step S92 of displaying the tag). Then, the procedure waits for a pointer event (step S93). If there occurs a pointer event, a page rolling operation is performed in accordance with the sort of event (step S94 of controlling the even driven display).

FIG. 30 shows the relation between the pointer event and the page rolling process. First, when a certain tag is dragged, a dragged page is moved gradually as shown in FIG. 26, and the next page is displayed (page rolling step). Then, the page may be moved along with the tag appended. Also, when a certain tag is clicked, a page indicated by the clicked tag is displayed. Also, if there is a difference between the pointer down position and the pointer up position within the same tag, that difference being above a predetermined threshold in the page rolling direction, the next page may be displayed.

In a case where a tag is dragged over plural tags, that is, there occurs a pointer down at a certain tag and then a pointer is moved in the tag display direction without pointer up, then the pointer is up at another tag, the pages indicated by the dragged tag are displayed successively in the order of being dragged. If the pointer down time or pressure is beyond a predetermined threshold in the tag or the information viewing area near the tag, a plurality of pages may be moved at a time, supposing that the number of sheets in accordance with the time or pressure are seized. Then, the tag being seized may be moved dynamically to the neighborhood of the pointer in accordance with the variation in time or pressure.

In the page information display apparatus for performing such page rolling operation, the viewing operation manager 45 may be provided with an event driven display controller. Each operation as shown in FIG. 30 can be also implemented by the CPU which executes the program. In this case, a method for each pointer event may rely on the use of a program which defines each operation.

As described above, in the third example, it is possible to rapidly switch the display from a page or chapter being viewed to arbitrary page or chapter to view the electronic information by designating a tag. Therefore, the user can perform the switching of page information easily. By designating the tags in succession, it is possible to simulate the operation of rolling the pages in a certain range roughly. Accordingly, the user can view the page information with the same sense and operation as when. reading the book.

<Related Art Translation Examples of Article Information, Information Structure>

Article information

In the above example, the page information having a size of one page was the minimum unit of data. On the contrary, when the entire one page of newspaper is displayed, or when the magazine article is displayed, each article may be enlarged and displayed. For the information in the book, it may be possible to enlarge the diagrams or drawings in the page for display. Such enlargement can be effected in such a way that the page information itself is created beforehand at high resolution, and the page information as image data is enlarged, or the page information is created with the vector data such as text or diagram and enlarged for display. When the article is enlarged for display, the length of current page tag is set to several times the normal length. Hence, it is possible to intuitively grasp the situation, for example, where a certain article contained in the electronic information is enlarged, depending on the shape of tag.

Figure 32:
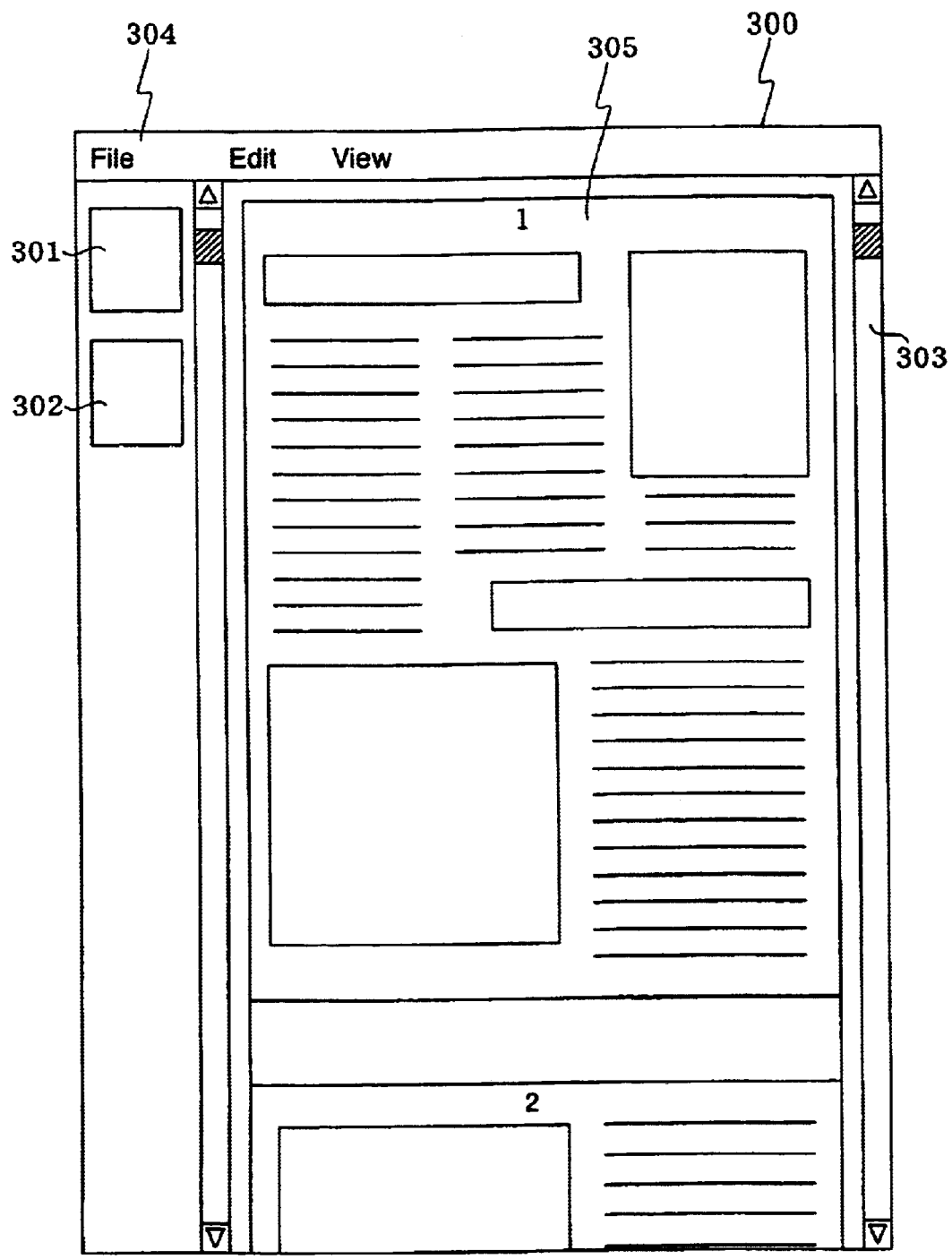
FIG. 32 is an explanatory view illustrating a conventional user interface.

When the article information is provided, it is preferable to specify the article information contained in the page information and the range of coordinates for the article information in the page information as shown in FIG. 32. If the user specifies the page information using an input unit 2, with a fingertip, when the coordinate value specified by the fingertip is contained within the range of coordinates, the article information corresponding to the range of coordinates is displayed on the display 1. Also, if the range of coordinates for this article information is defined by the ratio of it to the length of page information; the data is not dependent on the device.

Information structure translation

A method of creating page information viewable by the page information display portion from the electronic information 1A stored in the storage portion 4 will be specifically described below. The above page information display portion has a capability of viewing in a universal file format widely used for the electronic information, such as a text format, an image format, an HTML format, an XML format, or a PDF format. Therefore, when the linear information structure of viewing information is defined, it is desirable that each file format has an information structure in view of the information in a unit of page such as a book. However, as for the specific information structure of each file format, it is presumed that its specific structure can be recognized by the page information display portion. The reason is that the page information display portion is not intended to analyze the specific structure to each file format as its main purpose, and it is generally considered that the information structure can be easily analyzed from the file format as the conventional art.

The universal file formats widely used as the electronic information can be classified into four categories, depending on the information structure. A first category is typically a text format of information structure. The feature is that the length of one line of sentence, or the size or kind of font, is not defined, and the number of lines is not defined like a rolled book having no unit of page. Therefore, to view in a unit of page on the page information display portion, the size or kind of font is first defined to determine the amount of information contained in one page. Consequently, the page screen image can be determined, and stored in the storage portion as the viewing information, which can be viewed on the page information display portion.

A second category is an image format of information, such as a bit map format, a TIFF format, a PICT format, a JPEG format, or a GIF format. The page information display portion creates the viewing information having the image size translated so that the image format of information may be fully contained in the viewing area. Then, the information of the image format is divided by the size of the information viewing area to create the article information. And the viewing information and the article information are registered in the page table to enable viewing with the page information display portion.

A third category is typically an HTML format or an XML format of information structure. In order to view these file formats in the page information display portion, it is necessary to create a page table corresponding to a hyperlink structure and a frame (means for displaying electronic information in respective areas of divided display screen) First of all, a conversion method of the hyperlink structure in the page information display portion will be described below. The hyperlink structure allows the file on the Internet to be set at the link destination. Therefore, for all the information of HTML format or XML format, it is of no use to define the linear information structure by automatically looping the link destination, because the number of pages is increased without limit. Therefore, the page information display portion creates the viewing information only for the electronic information present within the same domain of electronic information to translate the information in the HTML format or XML format into the linear information structure. If the link destination is outside the same domain, the electronic information is ignored in the process of creating the linear information structure.

A fourth category is a PDF format (manufactured by Adobe: a file format viewable by Acrobat Reader) of information structure. Since the electronic information of the PDF format is in a unit of page, the page information display portion makes direct use of the electronic information of the PDF format in the given page order. The viewing information is created by transforming the image information of each page in the electronic information of the PDF format into the size which can be displayed in the viewing area. When the electronic information of the PDF format has the link structure, the link is ignored to secure the linear information structure, thereby making it possible to view the information of the PDF format.

Generally, it is desirable that the data in any of various formats is once transformed into the image data. To handle the viewing information as the image information, the third party is not allowed to easily alter the content, and the electronic papermark can be readily embedded into the viewing information according to the conventional art. Also, the viewing information can be readily applied on the surface of a virtual object as the texture information.

Rolling operation

In the above third example, the page rolling is performed by manipulating the tag. Further, the page rolling may be performed by an operation in the information viewing area. One specific method of rolling the page one after another to view the information is that the viewing operation manager 45 measures the amount of movement that the input coordinates (Px, Py) when the fingertip touches the input unit at first are moved to the input coordinates (PX, PY) within the elapse of a certain time measured by the timer 48. Herein, it is supposed that the amount of movement |PY-Py| in a Y axis direction is smaller than a certain magnitude (DY), and the amount of movement |PX-Px| in an X axis direction is larger than a certain magnitude (DX). If |PX-Px| is a negative value, the viewing operation manager 45 requests the display manager 44 to display the next page information in the information viewing area 5. If |PX-Px| is a positive value, the viewing operation manager 45 requests the display manager 44 to display the previous page information in the information viewing area 5.

Hence, for example, if a pointer 2A is moved to the right on the information viewing area 5, the page of the electronic information being displayed is rolled from left to right, while the next page appears gradually. Likewise, if the pointer 2A is moved to the left on the information viewing area 5, the page of the electronic information being displayed is rolled from right to left, while the previous page appears gradually. In this way, the viewing method of rolling the page one after another can be implemented in such a way that the viewing information is displayed in the viewing area, while the behavior of rolling the page is displayed virtually. That is to say, in this example, an intuitive viewing operation can be effected, as if the page or chapter were directly touched with a fingertip, by detecting the movement direction of the pointer (input cursor) in the viewing information.

In the operation with the tag and the operation in the information viewing area, the amount of pages to be rolled or the display rate for the consecutive display may be controlled in accordance with the speed or pressure of operation. Thus, the minute display control is enabled by more intuitive operation.

Comparative Example

Next, some advantages of the embodiments and examples as described above will be described below by comparison with the conventional example. A special display of touch panel type as shown in FIG. 2 is not used, but the computer as shown in FIG. 31 is used to view the page information. However, the computer 100 is a machine having the display 102 and the main device 103. Hence, the user layer who can operate an electronic oven but is not good at reservations of the video program may have an impression of difficulties of operation. In particular, the operation by the keyboard 104 or the mouse 105 is troublesome in the respect of simply viewing the information, as compared with the apparatus as shown in FIG. 2.

Further, when the electronic information provided in the computer is viewed, as opposed to viewing the paper information, the user is required to come skillful in the operations specific to the conventional graphical user interface, using an input unit such as keyboard 104 or mouse 105. Therefore, for example, the user is obliged to perform the operations which is greatly different from a routine work of rolling the page such as when the book is read. In particular, it is difficult for the user unfamiliar with the computer to easily view the electronic information.

The operation method specific to the conventional graphical user interface as described herein is to operate a virtual input device which is abstractly displayed on the output unit of the computer, using an input cursor which can be operated by the mouse. The virtual input device means, for example, a scroll bar 303, a pop-up menu 304, and pages 301, 032 of thumbnail representation displayed on the output unit of the computer as shown in FIG. 32.

As shown in FIG. 32, the electronic information of one page is displayed on the same screen, including the next page, depending on the size of the display and the amount of electronic information. This is moved by using the scroll bar 303, or the page is moved by using the thumbnail. However, since the scroll bar is artificial and never used in the practical viewing of books, it is necessary to come skillful in operating appropriately the direction or size.

On the contrary, the present invention makes use of the tag. When the tag is appended to the page of information side by side, most users may recall the label attached to the book. Therefore, it is sufficiently expected that the user is informed to use the tag when the user wants to move the page without any teaching. Further, the total amount of page information can not be known intuitively, depending on the state of the scroll bar. On the other hand, in the present invention, the total amount of page information can be grasped at a glance owing to the tags appended to all the pages. And in the example where the tags are arranged on the left and right sides around the current page, the position of the current page relative to the total page can be considerably made clearer than the conventional example as shown in FIG. 32.

It is common that the conventional tag for use with the paper or computer has a heading for plainly representing the content of information described in the page. This heading is plainly symbolic of the information extending over plural pages in most cases. Taking a quick look at the tags with the heading, it is not possible to know easily the heading designates the information from what page to what page. Since the heading is typically composed of words or phrases, the heading having too great number of characters is difficult to be attached to the tag. In such a case of attaching the heading to the tag with difficulty, the character size of the heading is reduced, or the characters to be written out of the tag are omitted. However, it is considered that the tag to be displayed in this situation does not exactly fulfill duties for the graphical user interface since it is difficult to rightly understand the heading information in each case. On the other hand, in the example of the present invention, since the page number is adopted as the tag content, the page position can be known in small size at a glance. Since the numbers are common throughout the world nations, the interface is consistent without regard to the language.

Figure 33A:
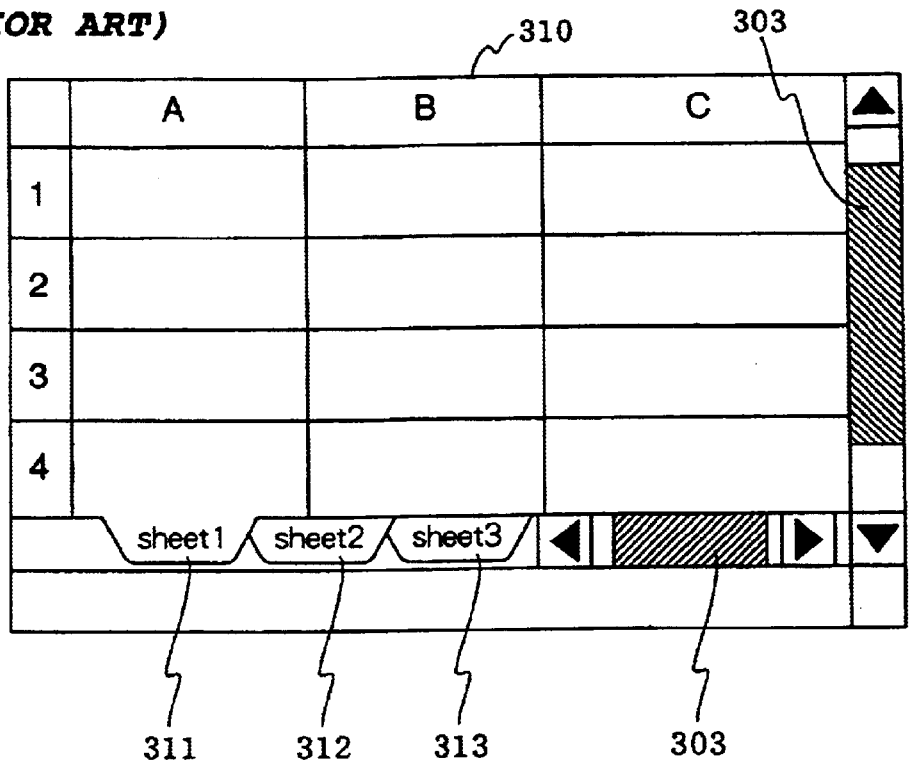
FIG. 33A is an explanatory view showing the state of selecting the sheet 1.
Figure 33B:
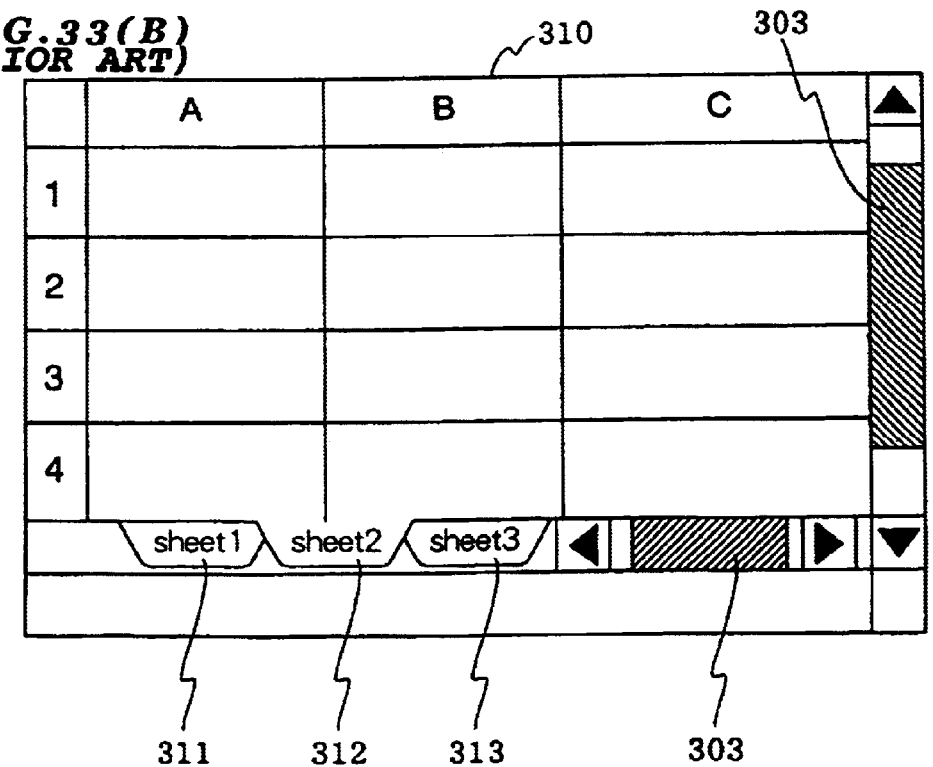
FIG. 33B is an explanatory view showing the state of selecting the sheet 2.

A sheet with tag for use in the spread sheet software (e.g., Excel (trademark) manufactured by Microsoft) is one of the interfaces in which the order of tags is not clearly defined. For instance, if a sheet 1 is opened, the arrangement of sheets is drawn in the order of the sheet 1 indicated by reference numeral 311, a sheet 2 indicated by reference numeral 312, and a sheet 3 indicated by reference numeral 313, as shown in FIG. 33A. However, if the sheet 2 is opened, it is possible to construe the arrangement of sheets in the order of sheet 2, sheet 1, and sheet 3 (or the order of sheet 2, sheet 3 and sheet 1), supposing that the physical sheets of paper are stacked, as shown in FIG. 33B. Only for the reason that the sheets are arranged in the order from the right, there is no gainsaying that the order of sheets is not changed, because it is unnatural visually. Some user layers may feel the interface to lack consistency and be irksome.

That is to say, the conventional tag does not present a linear information structure (information structure having visually fixed order of sheet 1, sheet 2 and sheet 3 in this example) in accordance with the order of pages such as a book. Therefore, the user may be visually confused with respect to the order of electronic information. It is troublesome, particularly for the purposes of easily viewing the information, that the recognition of such information structure may sometimes confuse the user.

On the other hand, due to the arrangement of tags in this example, the user can understand a linear structure of page information from the state of overlapped tags in both the normal and the semantic display. After rolling the page, the height or ratio of tag is consistently maintained. Accordingly, this interface may become attached to many users.

In the present invention as described above, the tag for calling the page succeeding the current page is displayed in one tag display area provided on one side of the information viewing area in the step of displaying succeeding page tag, while the tag for the page preceding the current page and already viewed is displayed in the other tag display area in the step of displaying preceding page tag. In a pair of tag display areas provided along with the information viewing information, the tags for the already viewed pages and the tags to be viewed around the current page are displayed. Therefore, the user can know the position of the current page relative to the total page number at a glance. In other words, the user can intuitively recognize the amount of pages already viewed and the amount of pages to be viewed at a glance. Unlike the user interface of slide bar or thumbnail or the like, this interface is comprehensible for the user unfamiliar with the computer, as well as the younger generation or the aged. This user interface in which the tags for the pages preceding and succeeding the current page are displayed on the tag display areas disposed on the left and right sides, or on the upper and lower sides, is implemented, so that the perusers of the electronic information can be extended over the wider generation, besides the computer user. Thereby, it is possible to provide a page information display method which is more excellent than conventionally provided.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-210788 (Filed on Jul. $26^{th}$, 1999) including specification, claims, drawings and summary are incorporated herein by reference in its entirety.

What is claimed is:

1. A page information display method for displaying electronic information, using an information viewing device comprising: a storage portion for storing electronic information having a plurality of pages in a unit of page of predetermined size; and a display portion having an information viewing area for displaying electronic information stored in said storage portion in a unit of said page, and a tag display area for displaying a tag indicating the content of said page, the tag display area being provided on either end of said information viewing area, said method including:

displaying a current page of current display object read from said storage portion in said information viewing area and displaying a tag appended to said current page in said one or the other tag display area;

displaying a tag appended to each page following said current page in one tag display area before or after displaying said current page; and displaying a tag appended to each page preceding said current page in the other tag display area before or after displaying said current page.

2. The page information display method according to claim 1, further including determining the height or position of a tag appended to said current page in a tag display direction, on the basis of the page number of said current page relative to the total page number of electronic information, subsequently to displaying said current page.

3. The page information display method according to claim 1, further including displaying the page number of the page with the tag appended as the tag content to be displayed within said tag, before or after displaying said current page.

4. The page information display method according to claim 3, further including highlighting the display of the tag appendant to said current page, subsequently to displaying said current page.

5. The page information display method according to claim 1, further including highlighting the display of the tag appendant to said current page, subsequently to displaying said current page.

6. The page information display method according to claim 1, further including changing the color of tag appended to each preceding page or each succeeding page as the absolute value of a difference between said current page and the page number of the page for appending the tag increases, subsequently to displaying said current page.

7. The page information display method according to claim 1, further including changing the shape of tag as the absolute value of a difference between said current page and the page number of the page for appending the tag increases, subsequently to displaying said current page.

8. The page information display method according to claim 1, further including:
defining the tag relation of positioning the tag at lower level, with the tag of said current page or the tag of the previous or next page of said current page at the uppermost level, as the absolute value of a difference between said current page and the page number of the page for appending the tag increases; and
overlaying an upper tag on a lower tag in said one or the other tag display area in accordance with a hierarchy of each page defined in the tag relation, before or after displaying said current page.

9. The page information display method according to claim 1, further including:
defining the relation of each tag belonging to a predefined class, when each of said current page and the previous and next pages belongs to the predefined class; and
displaying a class tag in said tag display area, the class tag indicating the content of class to which the tag of each page to be displayed in said tag display area belongs, subsequently to displaying said current page.

10. An electronic information display device, comprising:
a storage portion for storing electronic information having a plurality of pages in a unit of page of predetermined size;
a display portion having an information viewing area for displaying electronic information stored in said storage portion in a unit of said page, and a tag display area for displaying a tag indicating the content of said page, the tag display area being provided on either end of said information viewing area;
a page information display portion for displaying electronic information stored in said storage portion in said information viewing area, on the basis of the page specifying information input externally;
a current page tag display portion for displaying a current page tag appended to a current page of current display object read from said storage portion in said one or the other tag display area;
a succeeding page tag display portion for displaying a tag appended to each page following said current page at a forward position from the height of said current page tag in said one tag display area; and
a preceding page tag display portion for displaying a tag appended to each page preceding the page number of said current page at a rearward position from the height of said current page tag in said other tag display area.

11. A storage medium for storing a page information display program to display electronic information, using an information viewing device comprising:
a storage portion for storing electronic information having a plurality of pages in a unit of page of predetermined size; a display having an information viewing area for displaying electronic information stored in said storage portion in a unit of said page, and a tag display area for displaying a tag indicating the content of said page, the tag display area being provided on either end of said information viewing area; and a display controller for reading electronic information stored in said storage portion, on the basis of the page specifying information input externally, and displaying said electronic information with a predetermined tag appended on said display,
wherein said page information display program comprises, as the commands for operating said display controller:
a current page display command for displaying a current page of current display object read from said storage portion in said information viewing area and displaying a tag appended to said current page in said one or the other tag display area;
a succeeding page tag display command for displaying a tag appended to each page following said current page in said one tag display area, before or after displaying said current page; and
a preceding page tag display command for displaying a tag appended to each page preceding the page number of said current page in said other tag display area, before or after displaying said current page.

12. A page information display method for displaying electronic information, using an information viewing device comprising: a storage portion for storing electronic information having a plurality of pages in a unit of page of predetermined size; and a display portion having an information viewing area for displaying electronic information stored in said storage portion in a unit of said page, said display portion comprising a tag display area provided along with said information viewing area on both ends of said information viewing area in a page rolling direction to roll the page information in said information viewing area, said method including:
calculating the tag length in a tag display direction of each tag appended to each page, on the basis of the length of said tag display area in the tag display direction which is orthogonal to said page rolling direction and the total page number of electronic information stored in said storage portion;
displaying a tag in said tag display area, on the basis of the length of each tag calculated in calculating said tag length; and
displaying a current page of current display object read in said information viewing area, before or after displaying the tag.

13. The page information display method according to claim 12, wherein said calculating the tag length includes creating the semantic display for setting the length of tag appended to each page preceding and succeeding said current page to be shorter as the page increases or decreases from said current page, with the length of tag appended to said current page as the maximum length.

14. The page information display method according to claim 13, wherein said creating the semantic display includes creating the line tag display for displaying the presence or absence of page in a predetermined range close to the start page and the end page of electronic information at a part of the tag outline, when the total page number of electronic information is too large to be within the length of tag display area in said tag display direction.

15. The page information display method according to claim 14, wherein said creating the line tag display includes inserting the interval display outline of tag having a different color or thickness at every predetermined page interval.

16. The page information display method according to claim 13, further including displaying the tag content such as a page number for the tag having a length greater than or equal to a predetermined length in accordance with the length of each tag to be displayed in displaying said tag, before or after displaying the tag.

17. The page information display method according to claim 12, further including displaying the tag content such as a page number for the tag having a length greater than or equal to a predetermined length in accordance with the length of each tag to be displayed in displaying said tag, before or after displaying the tag.

18. A page information display device, comprising: a storage portion for storing electronic information having a plurality of pages in a unit of page of predetermined size; a display portion having an information viewing area for displaying electronic information stored in said storage portion in a unit of said page; and a page information display portion for reading electronic information stored in said storage portion on the basis of the page specifying information input externally, and for displaying said electronic information in said information viewing area, wherein:
  said display portion comprises a tag display area provided along with said information viewing area on either end of said information viewing area in a page rolling direction to roll the page information in said information viewing area;
  said page information display device further comprises a tag shape calculation portion for calculating the length of each tag appended to each page in a tag display direction, on the basis of the length of tag display area in the tag display direction which is orthogonal to said page rolling direction and the total page number of electronic information stored in said storage portion, and a tag display portion for displaying the tag in said tag display area, on the basis of the length of each tag calculated in said tag length calculation portion.

19. A storage medium for storing a page information display program to display electronic information, using an information viewing device comprising: a storage portion for storing electronic information having a plurality of pages in a unit of page of predetermined size; a display having an information viewing area for displaying electronic information stored in said storage portion in a unit of said page, and a tag display area for displaying a tag indicating the content of page, the tag display area being provided on either end of said information viewing area; and a display controller for reading electronic information stored in said storage portion, on the basis of page specifying information input externally, and displaying said electronic information with a predetermined tag appended on said display,
wherein said page information display program comprises, as the commands for operating said display controller:
  a tag length calculation command for calculating the length of each tag appended to each page in a tag display direction, on the basis of the length of tag display area in said tag display direction which is orthogonal to a page rolling direction to roll the page of said page information in said information viewing area and the total page number of electronic information stored in said storage portion; and
  a tag display command for displaying the tag in said tag display area, on the basis of the length of each tag calculated in accordance with said tag length calculation command.

20. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page, in which said display portion has a tag display area provided along with said information viewing area on either end in a page rolling direction to roll the page of said page information in said information viewing area, said method including:
  acquiring the physical length information of said display portion in the page rolling direction;
  calculating the minimum tag reference width at a resolution of said display portion, on the basis of the physical length information acquired in acquiring said physical length and the minimum tag reference width in the page rolling direction which is predetermined as the physical length;
  determining a width of said tag display area, on the basis of the minimum reference width calculated in calculating said minimum tag width and depending on said display portion and the quantity of said electronic information; and
  displaying the tag having the width determined in determining said tag display area width in said tag display area.

21. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page, in which said display portion has a tag display area provided along with said information viewing area on both ends in a page rolling direction to roll the page of said page information in said information viewing area, said method including:
  acquiring the physical length information of said display portion in a tag display direction which is orthogonal to the page rolling direction;
  calculating the minimum tag reference length at a resolution of said display portion, on the basis of the physical length information acquired in acquiring said physical length and the minimum tag reference length in the tag display direction which is predetermined as the physical length; and
  setting the current page tag length of a tag appended to said current page to be currently displayed to said minimum reference length, when the tag length per unit tag which is equal to the length of said display portion in said tag display direction divided by the total page number of electronic information is shorter than said minimum reference length.

22. A page information display device comprising a storage portion for storing electronic information having a plurality of pages in a unit of page of predetermined size, and a display portion having an information viewing area for displaying electronic information stored in said storage portion in a unit of said page, and a tag display area provided along with said information viewing area on both ends in a page rolling direction to roll the page of said page information in said information viewing area, wherein said page information display device further comprises a minimum reference shape storage portion for storing the minimum reference width of tag in the page rolling direction and the minimum reference length of tag in a tag display direction, which are predetermined on the basis of the size of said display portion, a tag display area width determining portion for determining the tag display area width on the basis of the minimum reference width of said tag and the size of said electronic information in the page rolling direction, a current page tag length setting portion for setting the current page tag length to a tag length per unit tag which is equal to the length of said display portion in said tag display direction divided by the total page number of electronic information, and setting the length of current page tag appended to a current page to be currently displayed to said minimum reference length, when said tag length is shorter than the minimum reference length of said tag, and a tag display portion for displaying the tag having a width determined by said tag display area width determining portion and a length set by said current page tag length setting portion in said tag display area.

23. A storage medium for storing page information display data which is read into an electronic information display device comprising a storage portion for storing electronic information having a plurality of pages in a unit of page of predetermined size, a display portion having an information viewing area for displaying electronic information stored in said storage portion in a unit of said page, and a tag display area provided along with said information viewing area on both ends in a page rolling direction to roll the page of said page information in said information viewing area, and a tag shape calculation portion for calculating the width of said tag display area and the size of tag to be displayed in said tag display area, on the basis of the predetermined page information display data, wherein said page information display data comprises the display dot number data of said display portion in each of the page rolling direction and a tag display direction, the total page number data of electronic information stored in said storage portion, the dot number data per unit tag which is equal to the number of dots in said dot number data divided by the total page number in said total page number data, and the minimum reference data having the minimum reference width of tag which is predetermined for the tag length in said page rolling direction and the minimum reference length of tag which is predetermined for the tag length in said tag display area, as compared with the number of dots per unit tag.

24. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page and a tag display area for displaying a tag indicating the content of said page, said tag display area being provided on either end of said information viewing area, said method including:

calculating the height of current page tag appended to a current page of current display object which is read from said storage portion, on the basis of the ratio of the current page number to the total page number;

displaying the current page read from said storage portion in said information viewing area and displaying a tag appended to said current page in said one or other tag display area with a current page tag height calculated in calculating said current page tag height;

displaying a succeeding page tag appended to each page following said current page in one tag display area with a height smaller than said current page tag height before or after displaying said current page;

displaying a preceding page tag appended to each page preceding the page number of said current page in said other tag display area with a height larger than said current page tag height before or after displaying said current page; and redisplaying a same height tag by moving the displayed tag in one or other tag display area while maintaining the height of said tag in rolling the page for said current page.

25. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page and a tag display area for displaying a tag indicating the content of said page, said tag display area being provided on either end of said information viewing area, said method including:

calculating the height of current page tag appended to a current page of current display object which is read from said storage portion, on the basis of the ratio of the current page number to the total page number of said electronic information;

displaying the current page read from said storage portion in said information viewing area and displaying the tag appended to said current page in said one or other tag display area with a current page tag height calculated in calculating said current page tag height;

displaying a succeeding page tag appended to each page following said current page in one tag display area with a height smaller than said current page tag height before or after displaying said current page;

displaying a preceding page tag appended to each page preceding the page number of said current page in said other tag display area with a height larger than said current page tag height before or after displaying said current page; and redisplaying a same ratio height tag by moving the displayed tag in one or other tag display area while calculating the current page tag height on the basis of the ratio of the page number of a new current page to the total page number in rolling the roll of said current page.

26. The page information display method according to claim 25, further including expanding the tab length of tag in the neighborhood of a predetermined pointer event, if said pointer event occurs in said one or other tag display area, before or after redisplaying said same ratio height tag.

27. A storage medium for storing a page information display program for displaying electronic information using an information viewing device comprising a storage portion for storing electronic information having a plurality of pages in a unit of page of predetermined size, a display having an information viewing area for displaying electronic information stored in said storage portion in a unit of said page, and a tag display area for displaying a tag indicating the content of said page, said tag display area being provided on either side of said information viewing area, and a display controller for controlling electronic information stored in said storage portion to be read on the basis of the page specifying information externally input, and displayed with a predetermined tag appended on said display, wherein said page information display program comprises the commands for operating said display controller including a tab expanding command for resetting the length of said displayed tag on the basis of the relation between the tag displayed in said tag display area and the pointer coordinates or pressure, and a tag length restore command for restoring the length of said reset tag to its original length after the elapse of a certain time since said pointer coordinates or pressure gets back to a steady state.

28. An electronic information display device comprising a storage portion for storing electronic information having a plurality of pages in a unit of page of predetermined size, and a display having an information viewing area for displaying electronic information stored in said storage portion in a unit of said page, and a tag display area provided along with said information viewing area, said tag display area being on either end of said information viewing area in a page rolling direction to roll the page of said page information in said information viewing area, wherein said electronic information display device further comprises a tag display mode selecting portion for selecting a normal display in which the length of tag to be displayed in said tag display area is constant, when the total page number of electronic information is less than or equal to a predetermined number, and selecting a semantic display in which the tag length is decreased stepwise from the current page tag, when the total page number exceeds the predetermined number.

29. A storage medium for storing a page information display program for displaying electronic information using an information viewing device comprising a memory for storing electronic information having a plurality of pages in a unit of page of predetermined size, a display having an information viewing area for displaying electronic information stored in said storage portion in a unit of said page, and a tag display area for displaying a tag indicating the content of said page, said tag display area being provided on either side of said information viewing area, and a display controller for controlling electronic information stored in said storage portion to be read on the basis of the page specifying information externally input, and displayed with a predetermined tag appended on said display, wherein said page information display program comprises the commands for operating said display controller including a tag length calculation command for calculating the tag length per tag on the basis of the total page number information of said electronic information and the length of said tag display area, a normal display command for setting said calculated tag length to a display tag length when the calculated tag length is above a predetermined tag length, a semantic display command for setting said predetermined tag length to the tag length of said current page when said calculated tag length is below the predetermined length and setting the length of tag appended to each page preceding and succeeding said current page to a shorter length stepwise, with the tag length of said current page at the uppermost level, and a tag height control command for redisplaying the tag with the constant height of each tag during said normal display or calculating the tag height on the basis of the page number of a new current page during the semantic display in rolling the current page displayed in said information viewing area.

30. A storage medium for storing the page information display data which is read into an electronic information display device comprising a storage portion for storing electronic information having a plurality of pages in a unit of page of predetermined size, a display portion having an information viewing area for displaying electronic information stored in said storage portion in a unit of said page, and a tag display area provided along with said information viewing area on both ends of said information viewing area in a page rolling direction to roll the page of the page information in said information viewing area, and a tab shape calculation portion for calculating the width of said tag display area and the size of tag to be displayed in said tag display area on the basis of the predetermined page information display data, wherein said page information display data has the dot number data per unit tag which is determined in accordance with the total page number of said electronic information and the length of said tag display area, the minimum reference data having the minimum reference width of tag which is predetermined for the tag length in said page rolling direction and the minimum reference length of tag which is predetermined for the tag length in said tag display area, as compared with the dot number per unit tag, and the tag ratio data which is referenced when the dot number data per unit tag is below said minimum reference data, in which the tag ratio data is a ratio of the tag length varied consecutively from the current page of said electronic information to the end page or start page relative to the tag length with said minimum reference data.

31. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page and a tag display area for displaying a tag indicating the content of said page, said tag display area being provided on either end of said information viewing area, said method including:

rolling the page to move a current page in a page rolling direction when an operation is applied on the tag displayed in said tag display area and to display the page in said information viewing area on the operation of said tag; and moving a tab appended to said current page in the page rolling direction between said one and other tag display areas at the same time when the current page is moved in rolling the page.

32. A page information display method for displaying electronic information using an information viewing device comprising a storage portion for storing electronic information having a plurality of pages in a unit of page of predetermined size, and a display portion having an information viewing area for displaying electronic information stored in said storage portion in a unit of said page and a tag display area for displaying a tag indicating the content of said page, said tag display area being provided on either end of said information viewing area, said method including:

displaying a tag appended to each page following a current page in said one tag display area, and displaying a tag preceding the current page in said other tag display area, on the basis of the page number of current page to be currently displayed which is read from said storage portion; and event driven display control process in said information viewing area to be changed in accordance with the kind of event, when there is a pointer event of pointing to the tag displayed in displaying said tag.

33. The page information display method according to claim 32, wherein said event driven display control process includes moving said page in accordance with the motion of drag when the tag appended to said each page is dragged.

34. The page information display method according to claim 33, further including displaying a next page in a space in the information viewing area provided in moving the current page, into which said tag is dragged, subsequently to said event driven display control process.

35. The page information display method according to claim 32, wherein said event driven display control process includes displaying electronic information of a page indicated by a tag, when the tag in said tag display area is clicked.

36. The page information display method according to claim 32, wherein said event driven display control process includes displaying successively each page in a tag slot when the tag slot displayed in said tag display area is dragged.

37. The page information display method according to claim 32, wherein said event driven display control process includes rolling a number of pages corresponding to the pressure or elapse time of pointer down for the tag of said current page.

38. An electronic information display device comprising a storage portion for storing electronic information having a plurality of pages in a unit of page of predetermined size, and a display portion having an information viewing area for displaying electronic information stored in said storage portion in a unit of said page and a tag display area provided along with said information viewing area, said tag display area being provided on either end of said information viewing area in a page rolling direction to roll the page information in said information viewing area, wherein said electronic information display device further comprises a tag display portion for displaying a tag appended to each page following a current page in said one tag display area, and displaying a tag appended to each page preceding the current page in said other tag display area, on the basis of the page number of current page to be currently displayed which is read from said storage portion, and an event driven display control portion for event driven display control process in said information viewing area to be changed in accordance with the kind of event, when there is a pointer event of pointing to the tag displayed in displaying said tag.

39. A storage medium for storing a page information display program for displaying electronic information using an information viewing device comprising a storage portion for storing electronic information having a plurality of pages in a unit of page of predetermined size, a display having an information viewing area for displaying electronic information stored in said storage portion in a unit of said page, and a tag display area for displaying a tag indicating the content of said page, said tag display area being provided on either side of said information viewing area, and a display controller for controlling electronic information stored in said storage portion to be read on the basis of the page specifying information externally input, and displayed with a predetermined tag appended on said display, wherein said page information display program comprises the commands for operating said display controller including a tab display command for displaying a tag appended to each page following a current page in said one tag display area and displaying a tag appended to each page preceding the current page in said other tag display area, on the basis of the page number of the current page to be currently displayed which is read from said storage portion, an event driven display control command for event driven display control process in said information viewing area to be changed in accordance with the kind of event, when there is a pointer event of pointing to the tag displayed in accordance with said tag display command, and a tag movement command for moving the current page in accordance with the motion of drag, when the tag appended to said current page is drugged.

40. The storage medium for storing the page information display program according to claim 39, wherein said event driven display control command comprises a command for displaying electronic information of a page indicated by a tag clicked, when the tag displayed in said tag display area is clicked.

41. The storage medium for storing the page information display program according to claim 39, wherein said event driven display control command comprises a command for displaying successively each page in a tag slot, when the tag slot displayed in said tag display area is dragged.

42. The storage medium for storing the page information display program according to claim 39, wherein said event driven display control process comprises a time dependent rolling command for rolling a number of pages corresponding to the elapse time of pointer down for the tag of said current page.

43. The storage medium for storing the page information display program according to claim 39, wherein said event driven display control process comprises a time dependent rolling command for rolling a number of pages corresponding to the pressure of pointer down for the tag of said current page.

* * * * *

UNITED STATES PATENT AND TRADEMARK OFFICE
CERTIFICATE OF CORRECTION

PATENT NO. : 6,741,268 B1
DATED : May 25, 2004
INVENTOR(S) : Keisuke Hayakawa

It is certified that error appears in the above-identified patent and that said Letters Patent is hereby corrected as shown below:

<u>Title page,</u>
Item [54], Title, should read -- PAGE INFORMATION DISPLAY METHOD AND APPARATUS, AND STORAGE MEDIUM FOR STORING PROGRAM OR DATA FOR DISPLAYING PAGE INFORMATION --

Signed and Sealed this

Twenty-fourth Day of August, 2004

JON W. DUDAS
*Director of the United States Patent and Trademark Office*